(12) United States Patent
Satoh et al.

(10) Patent No.: US 12,012,099 B2
(45) Date of Patent: Jun. 18, 2024

(54) INFORMATION PROCESSING APPARATUS, INFORMATION PROCESSING METHOD, MOVEMENT CONTROL APPARATUS, AND MOVEMENT CONTROL METHOD

(71) Applicant: SONY GROUP CORPORATION, Tokyo (JP)

(72) Inventors: Ryuta Satoh, Tokyo (JP); Suguru Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 333 days.

(21) Appl. No.: 17/593,047

(22) PCT Filed: Feb. 19, 2020

(86) PCT No.: PCT/JP2020/006446
§ 371 (c)(1),
(2) Date: Sep. 7, 2021

(87) PCT Pub. No.: WO2020/189156
PCT Pub. Date: Sep. 24, 2020

(65) Prior Publication Data
US 2022/0185278 A1    Jun. 16, 2022

(30) Foreign Application Priority Data
Mar. 20, 2019 (JP) .................. 2019-052450

(51) Int. Cl.
*B60W 30/14* (2006.01)
*B60W 40/08* (2012.01)
(Continued)

(52) U.S. Cl.
CPC .......... *B60W 30/146* (2013.01); *B60W 40/08* (2013.01); *B60W 60/0016* (2020.02);
(Continued)

(58) Field of Classification Search
CPC .. B60W 30/146; B60W 30/143; B60W 30/14; B60W 40/00; B60W 2540/01;
(Continued)

(56) References Cited

U.S. PATENT DOCUMENTS

| 10,692,371 B1 * | 6/2020 | Nix ........................ G08G 1/127 |
| 2019/0126911 A1 * | 5/2019 | Nienhueser ......... B60W 30/162 |

(Continued)

FOREIGN PATENT DOCUMENTS

| DE | 102017001052 A1 | 8/2017 |
| DE | 102018007432 A1 * | 2/2019 |

(Continued)

OTHER PUBLICATIONS

Extended European Search Report of EP Application No. 20773995.4, dated Aug. 4, 2022, 08 pages.

(Continued)

*Primary Examiner* — Jason Holloway
*Assistant Examiner* — Benjamin J Brosh
(74) *Attorney, Agent, or Firm* — CHIP LAW GROUP

(57) ABSTRACT

An imaging section images a passenger in a moving body. A boarding state detection section detects a boarding state of the passenger on the basis of a captured image. An allowable acceleration setting section sets, for each passenger, individual allowable acceleration on the basis of the boarding state of the passenger, for example, the lateral spacing between the feet of the passenger, the arrangement angle of the feet with respect to the moving direction of the moving body, and the like. Further, integration is performed on the individual allowable acceleration determined for the respective passengers in the moving body, and the acceleration that is allowable for the moving body is set The according to the (Continued)

boarding state of each passenger. Thus, the moving body is prevented from moving at acceleration at which the passengers may be endangered.

17 Claims, 19 Drawing Sheets

(51) Int. Cl.
    *B60W 60/00*     (2020.01)
    *G01C 21/34*     (2006.01)
    *B60W 50/00*     (2006.01)

(52) U.S. Cl.
    CPC ... *G01C 21/343* (2013.01); *B60W 2040/0881* (2013.01); *B60W 2050/0026* (2013.01); *B60W 2420/403* (2013.01); *B60W 2540/01* (2020.02); *B60W 2540/103* (2013.01); *B60W 2540/223* (2020.02); *B60W 2540/227* (2020.02)

(58) Field of Classification Search
    CPC ....... B60W 2540/00; B60W 2540/045; B60W 2540/223; B60W 2540/227; B60W 2040/0881; B60W 40/08; B60W 2420/42; B60W 2540/103; B60W 2300/10; B60W 50/0098; B60W 60/0011; B60W 60/0015; B60W 60/0016; B60W 60/0018; B60W 2050/0026; G01C 21/343; G01C 21/3407; G01C 21/34; G06V 20/593
See application file for complete search history.

(56) References Cited

U.S. PATENT DOCUMENTS

| | | | |
|---|---|---|---|
| 2019/0193722 A1* | 6/2019 | Yamamuro | B60G 17/08 |
| 2019/0250622 A1* | 8/2019 | Nister | G06V 20/584 |
| 2020/0081611 A1* | 3/2020 | Beaurepaire | G06F 3/04847 |

FOREIGN PATENT DOCUMENTS

| | | | | | |
|---|---|---|---|---|---|
| DE | 102018007432 | A1 | | 2/2019 | |
| EP | 3782839 | A1 | | 2/2021 | |
| JP | 2002-170188 | A | | 6/2002 | |
| JP | 2008037210 | A | | 2/2008 | |
| JP | 2008-120271 | A | | 5/2008 | |
| JP | 2014-044523 | A | | 3/2014 | |
| JP | 2015-145849 | A | | 8/2015 | |
| JP | 2016-062414 | A | | 4/2016 | |
| JP | 2016062414 | A | * | 4/2016 | |
| JP | 2017-021651 | A | | 1/2017 | |
| JP | 2017020859 | A | | 1/2017 | |
| JP | 2017-146744 | A | | 8/2017 | |
| JP | 2017169981 | A | | 9/2017 | |
| JP | 2018144544 | A | * | 9/2018 | |
| JP | 2020093700 | A | * | 6/2020 | ............ B60W 50/00 |
| WO | 2015/057145 | A1 | | 4/2015 | |
| WO | WO-2015057145 | A1 | * | 4/2015 | ............ B60W 30/18 |

OTHER PUBLICATIONS

International Search Report and Written Opinion of PCT Application No. PCT/JP2020/006446, dated May 19, 2020, 10 pages of ISRWO.

* cited by examiner

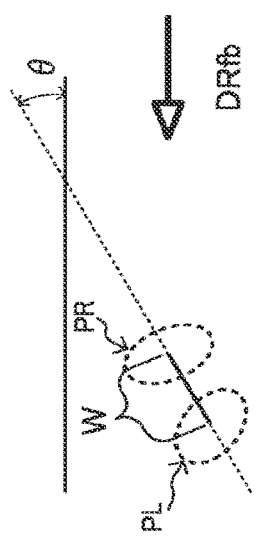
FIG. 5D
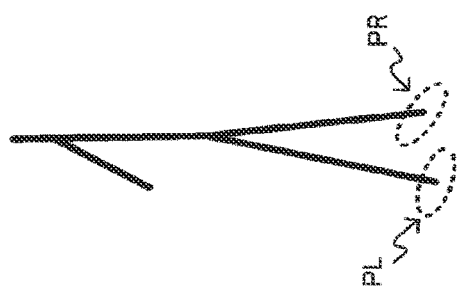
FIG. 5E
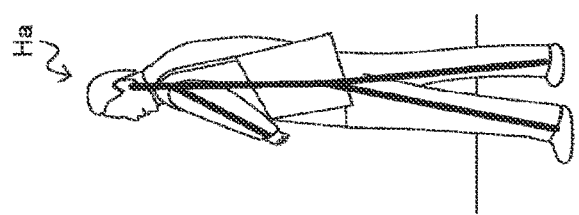
FIG. 5C
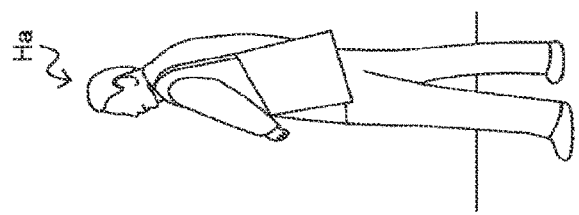
FIG. 5B
FIG. 5A

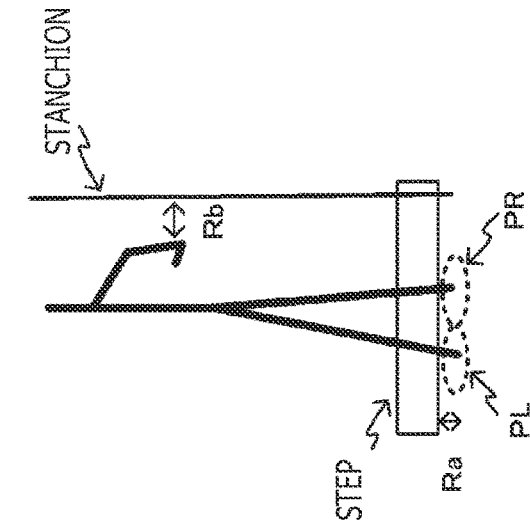
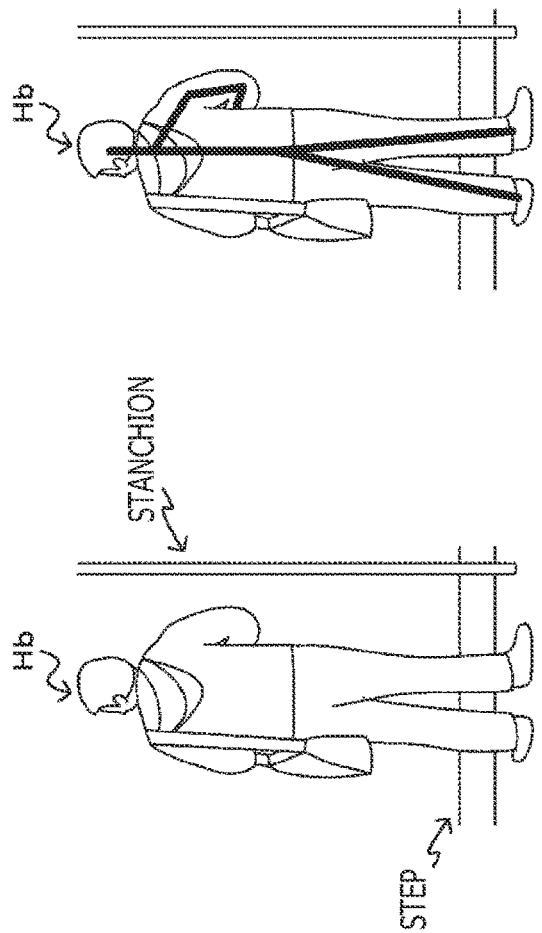

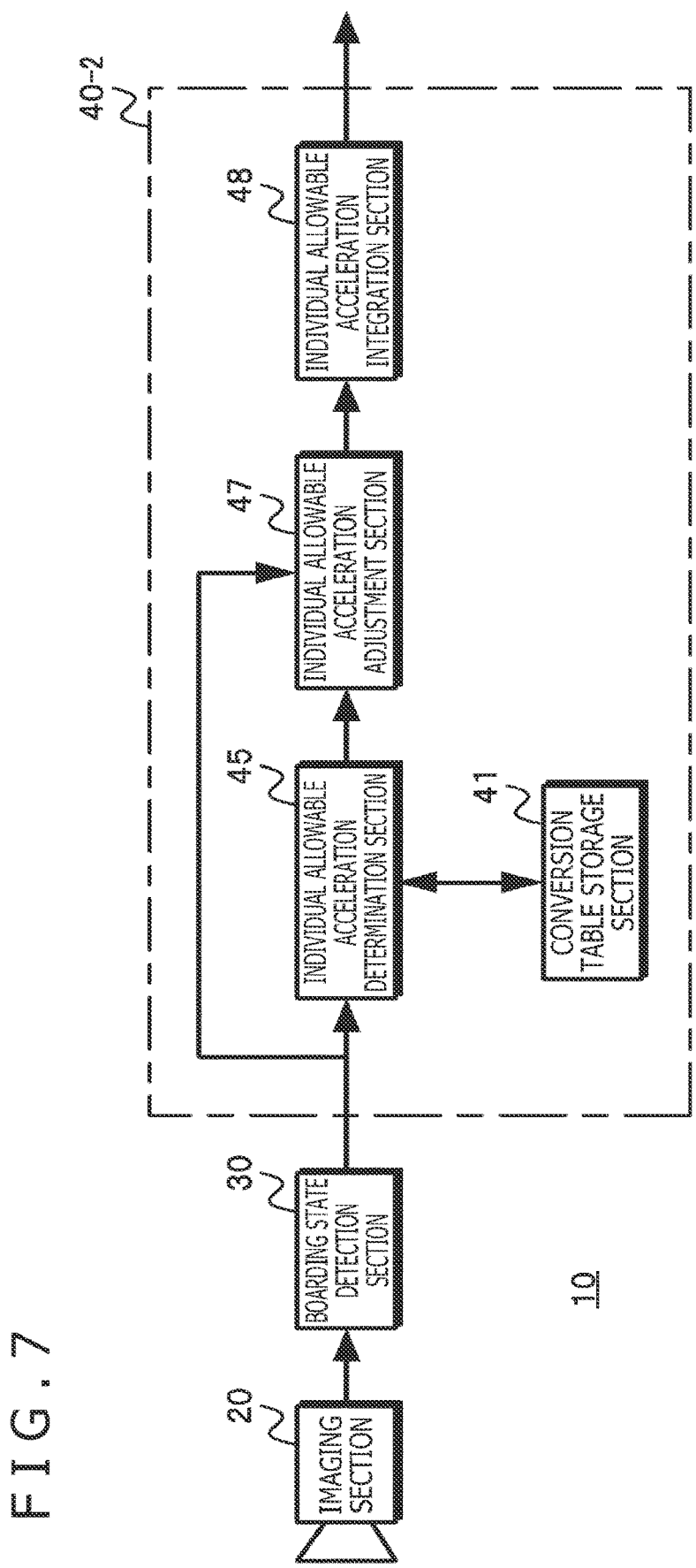

| ANGLE θ | WIDTH W | ALLOWABLE ACCELERATION |
|---|---|---|
| 0 | Wa | DRfb ← ● → DRlr |
| 90 | Wb (>Wa) | DRfb ← ● → DRlr |
| ... | ... | ... |

| ANGLE θ | WIDTH W | ALLOWABLE ACCELERATION |
|---|---|---|
| 0 | Wa | DRfb ← ● → DRlr |
| 90 | Wb (>Wa) | DRfb ← ● → DRlr |
| ... | ... | ... |

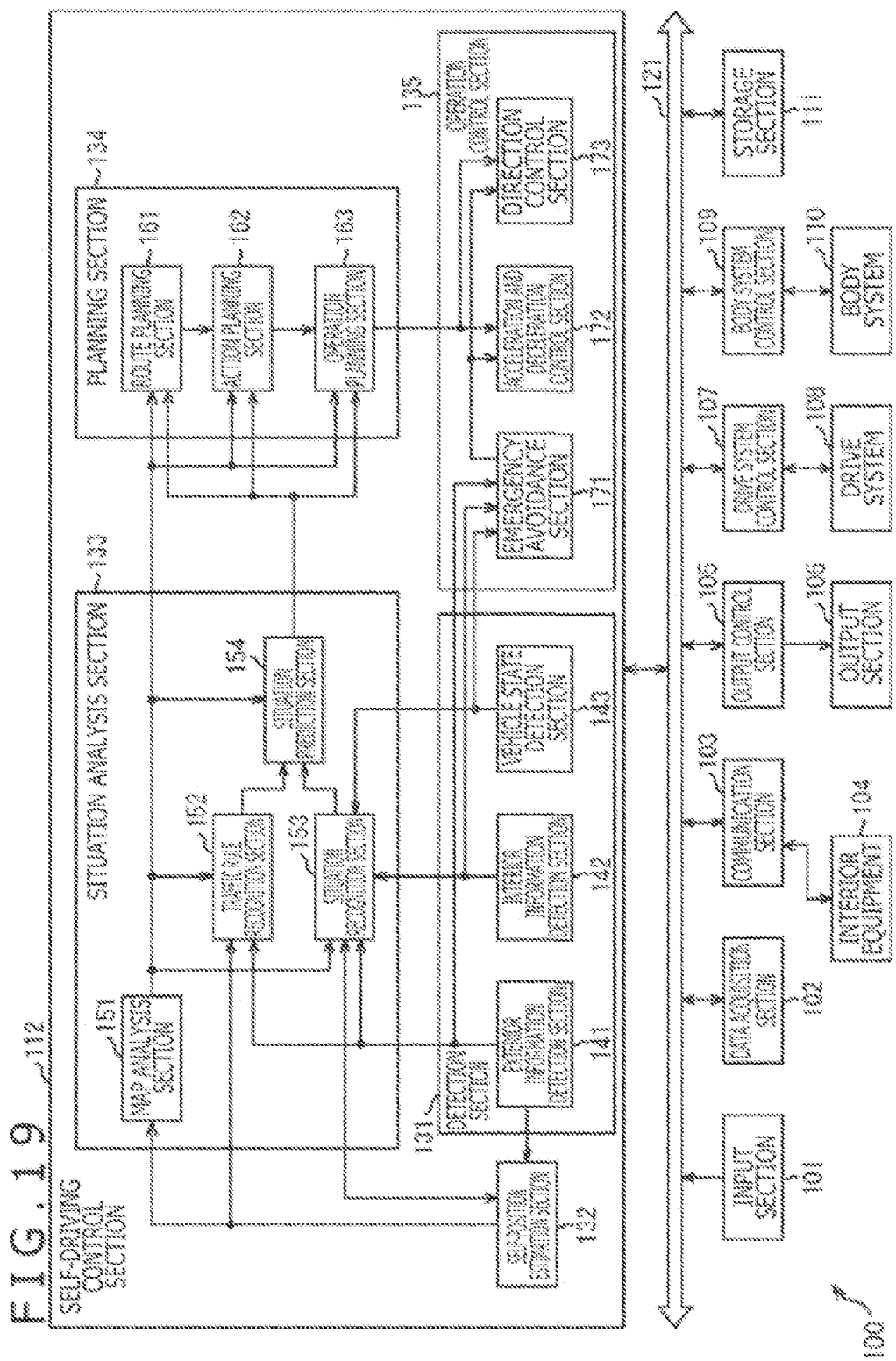

INFORMATION PROCESSING APPARATUS, INFORMATION PROCESSING METHOD, MOVEMENT CONTROL APPARATUS, AND MOVEMENT CONTROL METHOD

CROSS REFERENCE TO RELATED APPLICATIONS

This application is a U.S. National Phase of International Patent Application No. PCT/JP2020/006446 filed on Feb. 19, 2020, which claims priority benefit of Japanese Patent Application No. JP 2019-052450 filed in the Japan Patent Office on Mar. 20, 2019. Each of the above-referenced applications is hereby incorporated herein by reference in its entirety.

TECHNICAL FIELD

The present technique relates to an information processing apparatus, an information processing method, a movement control apparatus, and a movement control apparatus, and allows improvement of safety of passengers in a moving body.

BACKGROUND ART

In the related art, for moving bodies such as buses intended to transport seated or standing passengers, an operator operates the moving body while checking the safety of the passengers with use of a mirror or a monitor. However, passengers who are not seated or who are not holding stanchions or straps may, for example, fall due to motion of the moving body. Thus, PTL 1 describes recognition of the boarding states of the passengers and the traveling state of the vehicle and issuance of an alarm related to the safety of the passengers based on the boarding states and the traveling state.

CITATION LIST

Patent Literature

[PTL 1]
JP 2016-062414A

SUMMARY

Technical Problem

Incidentally, PTL 1 describes issuance of a danger alarm by images and sound and thus fails to ensure safety if the passengers do not take an action corresponding to the alarm.

Thus, an object of the present technique is to provide an information processing apparatus, an information processing method, a movement control apparatus, and a movement control method that are capable of improving the safety of passengers without depending on an alarm related to safety.

Solution to Problem

A first aspect of the present technique provides an information processing apparatus including an allowable acceleration setting section configured to set acceleration allowable for a moving body, on the basis of a boarding state of a passenger in the moving body.

In the present technique, the allowable acceleration setting section, for example, detects the boarding state of the passenger on the basis of a captured image of the passenger in the moving body. In detection of the boarding state, the posture of the passenger, for example, the lateral spacing between the feet of the passenger and the arrangement angle of the feet with respect to the moving direction of the moving body, a posture holding state of the passenger, and the like, is detected. Further, the position of the passenger in the moving body or a temporal change in boarding state may be used as the boarding state. On the basis of such a boarding state, the allowable acceleration is set using a conversion table indicating the relation between the boarding state and the allowable acceleration. As the conversion table, a conversion table corresponding to a moving situation of the moving body is used. Further, a conversion table corresponding to a moving route of the moving body may be used, and the conversion table may be switched in response to a change in moving situation. In addition, the allowable acceleration setting section performs integration on the allowable acceleration determined for the respective passengers and sets the acceleration allowable for the moving body.

A second aspect of the present technique is an information processing method including setting, by an allowable acceleration setting section, acceleration allowable for a moving body, on the basis of a boarding state of a passenger in the moving body.

A third aspect of the present technique provides a movement control apparatus including an allowable acceleration setting section configured to set acceleration allowable for a moving body, on the basis of a boarding state of a passenger in the moving body; and a control section configured to control movement of the moving body in such a manner as to avoid exceeding the allowable acceleration set by the allowable acceleration setting section.

In the present technique, the allowable acceleration setting section sets the acceleration allowable for the moving body, on the basis of a boarding state of a passenger in the moving body, for example, the boarding state of the passenger detected on the basis of a captured image obtained by imaging the passenger in the moving body. The control section performs control of movement of the moving body, for example, setting of a moving route, in such a manner as to avoid exceeding the allowable acceleration set by the allowable acceleration setting section. In setting of the moving route, a route involving acceleration not exceeding the allowable acceleration is used as a candidate route, and candidate route that involves lowest acceleration or acceleration that is least different from the allowable acceleration is set as the moving route. Further, in a case where no route involves acceleration equal to or lower than the allowable acceleration, a route involving the lowest acceleration is set as the moving route.

A fourth aspect of the present technique provides a movement control method including setting, by an allowable acceleration setting section, acceleration allowable for a moving body, on the basis of a boarding state of a passenger in the moving body, and controlling, by a control section, movement of the moving body in such a manner as to avoid exceeding the allowable acceleration set by the allowable acceleration setting section.

BRIEF DESCRIPTION OF DRAWINGS

FIGS. 5A, 5B, 5C, 5D, and 5E depict diagrams illustrating an operation example of the first embodiment.

FIGS. 6A, 6B, 6C, 6D, and 6E depict diagrams illustrating another operation example of the first embodiment.

FIG. 7 is a diagram illustrating a configuration of a second embodiment of the information processing apparatus.

FIG. 19 is a diagram depicting a general configuration example of functions of a vehicle control system.

DESCRIPTION OF EMBODIMENTS

Figure 1:
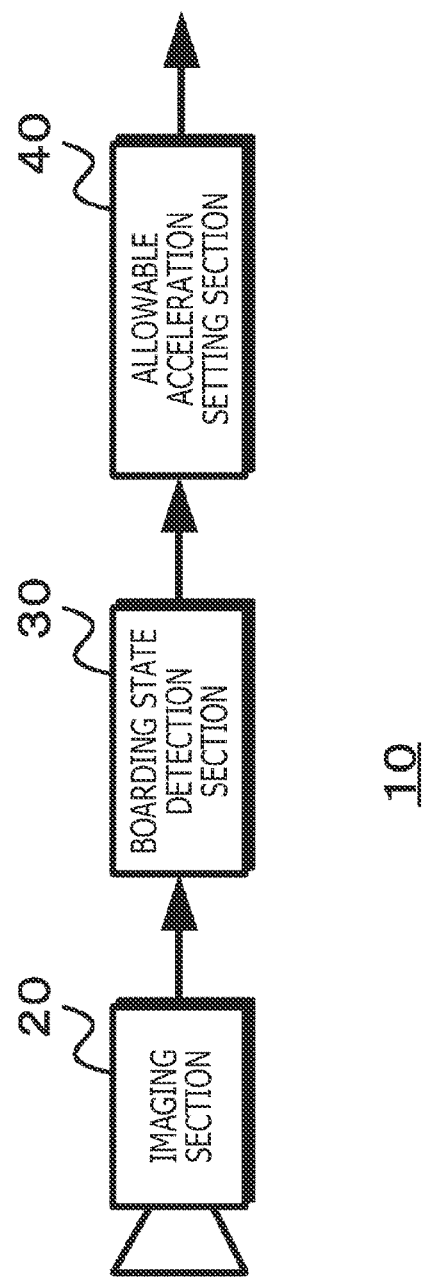
FIG. 1 is a diagram illustrating a configuration of an information processing apparatus.

Forms for performing the present technique will be described below. Note that the description will be given in the following order.
1. Information Processing Apparatus
1-1. First Embodiment
1-2. Second Embodiment
1-3. Third Embodiment
1-4. Fourth Embodiment
2. Movement Control Apparatus
2-1. Configuration and Operation of Control Section
3. Other Embodiments
4. Applied Example 1. Information Processing Apparatus The information processing apparatus of the present technique sets acceleration allowable for a moving body (hereinafter referred to as the "moving body allowable acceleration"), on the basis of a boarding state of a passenger in the moving body. FIG. 1 illustrates a configuration of the information processing apparatus. Note that FIG. 1 depicts a case in which an information processing apparatus 10 is provided not only with an allowable acceleration setting section 40 configured to set the moving body allowable acceleration but also with an imaging section 20 configured to image a passenger in the moving body in order to detect the boarding state of the passenger in the moving body and a boarding state detection section 30 configured to detect the boarding state of the passenger on the basis of an image acquired by the imaging section 20 but the information processing apparatus of the present technique may include only the allowable acceleration setting section 40.

The imaging section 20 includes an imaging lens that forms an optical image of a subject on an imaging surface of an imaging element, the imaging element such as a CMOS (Complementary Metal Oxide Semiconductor) or a CCD (Charge Coupled Device) which performs photoelectric conversion to generate an image signal corresponding to the optical image, an image signal processing section configured to execute camera signal processing on the image signal generated by the imaging element, to generate an image signal indicating a captured image of high image quality, and the like. The imaging section 20 generates an image signal of a captured image depicting the passenger in the moving body and outputs the image signal to the boarding state detection section 30.

The boarding state detection section 30 uses the image signal generated by the imaging section 20, to detect the boarding state of the passenger for each passenger included in the captured image. The boarding state detection section 30 matches, for example, feature points and the like extracted from the captured image against the shape of an object defined by model data and the like, to detect, as the boarding state, the posture of the passenger or the posture of the passenger and the position of the passenger in the moving body. Further, the boarding state detection section 30 may detect, as the boarding state, a state in which a stanchion or a strap is gripped. Further, the boarding state detection section 30 may use machine learning or the like to detect the boarding state of the passenger on the basis of the captured image. The boarding state detection section 30 outputs a detection result for the boarding state to the allowable acceleration setting section 40. Note that the detection of the boarding state may be performed using not only the image generated by the imaging section 20 but also various sensors or the like.

The allowable acceleration setting section 40 sets the moving body allowable acceleration on the basis of the boarding state detected by the boarding state detection section 30. For example, the allowable acceleration is determined for each passenger in the moving body, integration is performed on the allowable acceleration determined for the respective passengers (hereinafter referred to as the "individual allowable acceleration"), and the moving body allowable acceleration is set. Note that the configuration and operation of the allowable acceleration setting section 40 will be described in embodiments described later.

Figure 2:
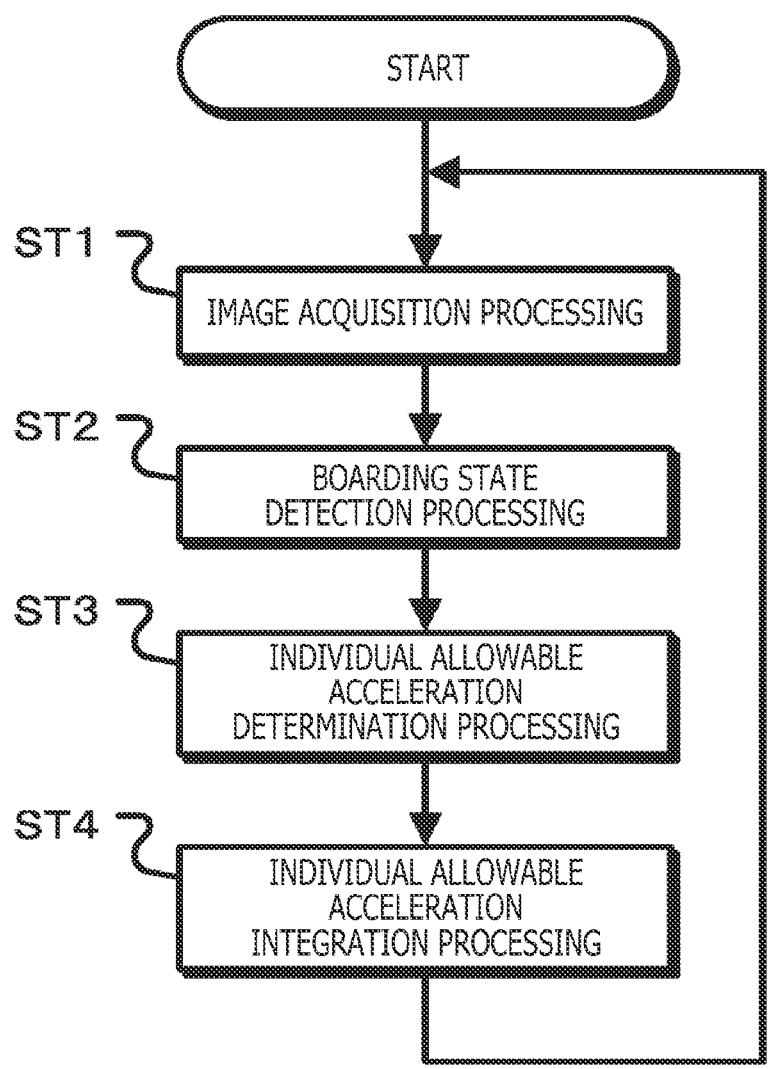
FIG. 2 is a flowchart illustrating an operation of the information processing apparatus.

FIG. 2 is a flowchart illustrating an operation of the information processing apparatus. In step ST1, the information processing apparatus 10 executes image acquisition processing. The information processing apparatus 10 acquires a captured image of a passenger in the moving body and proceeds to step ST2.

In step ST2, the information processing apparatus 10 executes boarding state detection processing. The information processing apparatus 10 detects, for each passenger, the boarding state of the passenger on the basis of the captured image acquired in step ST1, and proceeds to step ST3.

In step ST3, the information processing apparatus 10 executes individual allowable acceleration determination processing. The information processing apparatus 10 determines, the individual allowable acceleration for each passenger on the basis of the boarding state detected in step ST2, and proceeds to step ST4.

In step ST4, the information processing apparatus 10 executes individual allowable acceleration integration processing. The information processing apparatus 10 performs integration on the individual allowable acceleration determined for the respective passengers in step ST3 and sets the moving body allowable acceleration.

1-1. First Embodiment

Figure 3:
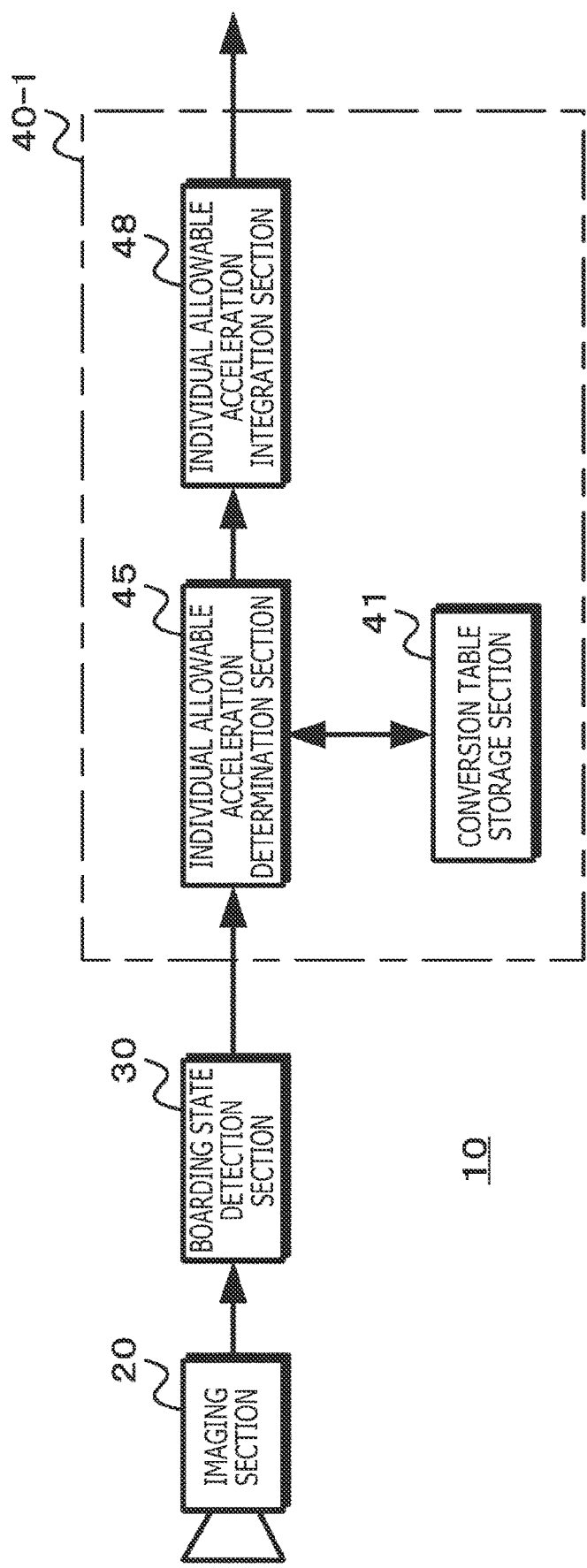
FIG. 3 is a diagram illustrating a configuration of a first embodiment of the information processing apparatus.

FIG. 3 illustrates a configuration of a first embodiment of the information processing apparatus. The information processing apparatus 10 includes the imaging section 20, the boarding state detection section 30, and an allowable acceleration setting section 40-1. Further, the allowable acceleration setting section 40-1 includes a conversion table storage section 41, an individual allowable acceleration determination section 45, and an individual allowable acceleration integration section 48.

The conversion table storage section 41 stores conversion tables indicating the allowable acceleration based on the boarding states. For example, the conversion table storage section 41 stores conversion tables indicating the allowable acceleration corresponding to parameter values, using, as a parameter, the boarding state detected for each passenger by the boarding state detection section 30.

The individual allowable acceleration determination section 45 determines, for each passenger, the individual allowable acceleration corresponding to the detection result for the boarding state, based on the conversion tables stored in the conversion table storage section 41. The individual allowable acceleration determination section 45 outputs, to the individual allowable acceleration integration section 48, the determination result for the individual allowable acceleration for each passenger.

The individual allowable acceleration integration section 48 executes integration processing on the individual allowable acceleration determined for the respective passengers by the individual allowable acceleration determination section 45 and sets, as the moving body allowable acceleration, each individual allowable acceleration that is the lowest in the respective directions.

Figure 4:
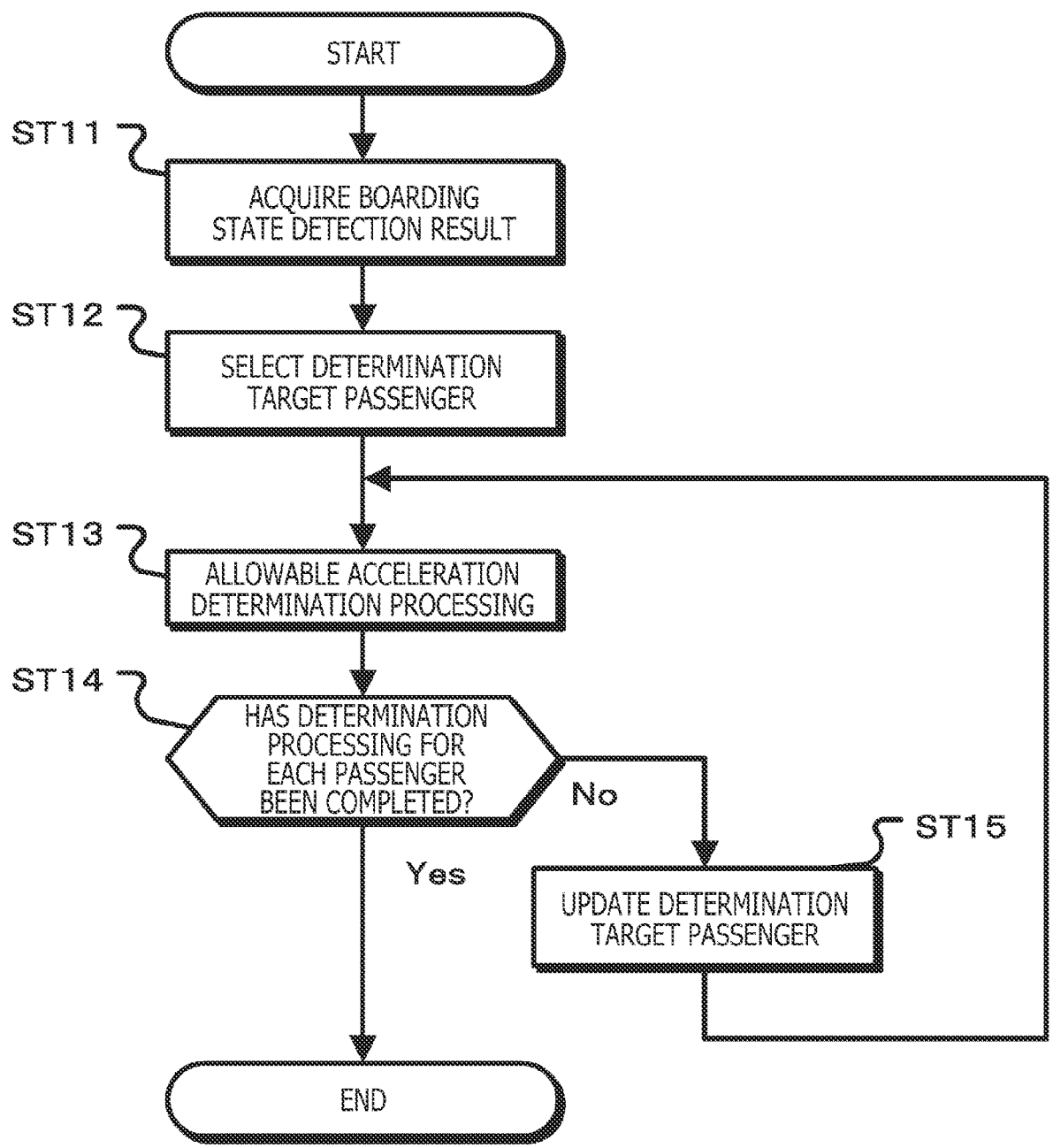
FIG. 4 is a flowchart illustrating an operation of the first embodiment.

FIG. 4 is a flowchart illustrating an operation of the first embodiment. Note that the flowchart indicates individual allowable acceleration determination processing in FIG. 2.

In step ST11, the allowable acceleration setting section acquires the boarding state detection result. The allowable acceleration setting section 40-1 acquires detection information indicating the boarding state detected for each passenger by the boarding state detection section 30, and proceeds to step ST12.

In step ST12, the allowable acceleration setting section selects a determination target passenger. The allowable acceleration setting section 40-1 selects, as a determination target passenger, a passenger for whom the individual allowable acceleration has not been determined, and proceeds to step ST13.

In step ST13, the allowable acceleration setting section executes allowable acceleration determination processing. The allowable acceleration setting section 40-1 uses the conversion tables stored in the conversion table storage section 41, to determine the individual allowable acceleration corresponding to the boarding state of the determination target passenger, and proceeds to step ST14.

In step ST14, the allowable acceleration setting section determines whether the determination processing has been completed for each passenger. The allowable acceleration setting section 40-1 proceeds to step ST15 in a case where the individual allowable acceleration has not been determined for any of the passengers, but ends the determination processing in a case where the individual allowable acceleration has been determined for all the passengers.

In step ST15, the allowable acceleration setting section updates the determination target passenger. The allowable acceleration setting section 40-1 sets, as a new determination target passenger, the passenger for whom the individual allowable acceleration has not been determined, and returns to step ST13.

Subsequently, the allowable acceleration setting section 40-1 performs integration on the individual allowable acceleration determined for the respective passengers by the processing from step ST11 to step ST15 and sets the moving body allowable acceleration. For example, the allowable acceleration setting section 40-1 selects, for each direction, the acceleration having the lowest value among the values of the individual allowable acceleration determined for the respective passengers, and sets the selected acceleration as the moving body allowable acceleration.

FIGS. 5A, 5B, 5C, 5D, and 5E depict an operation example of the first embodiment. In this operation example, illustrated is a case of using the posture of the passenger, for example, the lateral spacing between the feet of the passenger and the arrangement angle of the feet with respect to the moving direction of the moving body, as the boarding state of the passenger. In this case, the conversion table storage section 41 stores conversion tables each indicating the allowable acceleration for the lateral spacing between the feet of the passenger and the arrangement angle of the feet.

In FIGS. 5A, 5B, 5C, 5D, and 5E FIG. 5A illustrates an input image acquired by the imaging section 20 by imaging the passenger. The boarding state detection section 30 performs, for example, detection of feature points of a passenger Ha in the input image, and estimates the posture of the passenger Ha on the basis of a detection result. Note that FIG. 5B depicts an input image and a posture estimation result. The boarding state detection section 30 detects foot positions PL and PR of the passenger Ha on the basis of the posture estimation result, as depicted in FIG. 5C. On the basis of the foot positions PL and PR detected, the individual allowable acceleration determination section 45 calculates a width (spacing) W between the foot positions PL and PR and an arrangement angle θ of the feet with respect to a moving direction DRfb of the moving body as depicted in FIG. 5D, and determines the width W and the angle θ to be parameter values. Further, the individual allowable acceleration determination section 45 uses a conversion table depicted in FIG. 5E, to acquire the individual allowable acceleration corresponding to the parameter values (width W and angle θ) of the passenger Ha. For example, an angle θ of 90° corresponds to instability with respect to the acceleration in the moving direction DRfb, and an increased width W improves stability with respect to the acceleration in the arrangement direction of the feet, and thus the allowable acceleration in a direction DR1r orthogonal to the moving direction DRfb is determined to be high. Note that, in FIGS. 5E and 6E, 11A, 11B, 11C, and 18 described later, the inside of a filled circle or ellipse corresponds to the allowable acceleration.

The individual allowable acceleration determination section 45 executes the individual allowable acceleration determination processing for each passenger as described above, and the individual allowable acceleration integration section 48 executes integration processing on the individual allowable acceleration determined for the respective passengers and sets the lowest individual allowable acceleration as the moving body allowable acceleration for each direction.

FIGS. 6A, 6B, 6C, 6D, and 6E depict another operation example of the first embodiment. In this operation example, illustrated is a case of further using, as the boarding state of the passenger, the position of the passenger, for example, the position of the passenger in the moving body, specifically, a distance from an obstacle (for example, a step) in the moving body or a distance from a support (for example, a stanchion) provided in the moving body. In this case, the conversion tables stored in the conversion table storage section 41 indicate the allowable acceleration corresponding to the arrangement angle of the feet with respect to the moving direction of the moving body, the distance to the obstacle, and the distance to the support.

In FIGS. 6A, 6B, 6C, 6D, and 6E, FIG. 6A illustrates an input image acquired by the imaging section 20 by imaging the passenger. The boarding state detection section 30 performs, for example, detection of feature points of a passenger Hb in the input image, and estimates the posture of the passenger Hb on the basis of a detection result. Note that FIG. 6B depict an input image and a posture estimation result. On the basis of the posture estimation result, the boarding state detection section 30 calculates an arrangement angle θ of the feet with respect to the moving direction DRfb of the moving body and also calculates a distance Ra to a step and a distance Rb to a stanchion as depicted in of FIG. 6C. As depicted in FIG. 6D, the boarding state detection section 30 uses, as parameters, the objects indicated by the distances, the distances to the objects, and the arrangement angle θ of the feet with respect to the moving direction DRfb. Further, the individual allowable acceleration determination section 45 uses a conversion table depicted in FIG. 6E, to acquire individual allowable acceleration corresponding to parameter values (objects indicated by the distances, the distances Ra and Rb to the objects, and the angle θ) for the passenger Hb. Note that a short distance Rb to the support (stanchion) enables easy supporting of the body with use of the support. Consequently, in a case where the distance Rb is shorter than a threshold Rbth, allowable acceleration determined on the basis of the distance Rb may be given priority over allowable acceleration determined on the basis of the angle θ and the distance Ra.

The processing as described above sets the moving body allowable acceleration according to the posture states of the passengers even in a case where the passengers do not take an action corresponding to an alarm issued by the moving body and related to safety, thus allowing the safety of the passengers to be improved.

1-2. Second Embodiment

Now, a second embodiment will be described. In the second embodiment, described is a case of detecting, as the boarding state, not only the posture and position but also a surrounding environment state and posture holding state of each passenger, for example, whether the passenger is grabbing the stanchion, the strap, or the like and can hold the posture even in a case where a change in the speed of the moving body or the like occurs.

FIG. 7 illustrates a configuration of a second embodiment of the information processing apparatus. The information processing apparatus 10 includes the imaging section 20, the boarding state detection section 30, and an allowable acceleration setting section 40-2. Further, the allowable acceleration setting section 40-2 includes the conversion table storage section 41, the individual allowable acceleration determination section 45, an individual allowable acceleration adjustment section 47, and the individual allowable acceleration integration section 48.

The conversion table storage section 41 stores conversion tables indicating allowable acceleration based on the boarding state. For example, stored is the conversion table that uses, as a parameter, the boarding state detected for each passenger by the boarding state detection section 30 to indicate allowable acceleration corresponding to parameter values.

The individual allowable acceleration determination section 45 determines, for each passenger, the individual allowable acceleration corresponding to the detection result for the boarding state, on the basis of the conversion tables stored in the conversion table storage section 41. The individual allowable acceleration determination section 45 outputs the determination result for the individual allowable acceleration for each passenger to the individual allowable acceleration adjustment section 47.

The individual allowable acceleration adjustment section 47 adjusts, according to the posture holding state of each passenger, the individual allowable acceleration determined for the passenger by the individual allowable acceleration determination section 45. For example, the passenger grabbing the stanchion, the strap, or the like can deal with higher acceleration. Consequently, the individual allowable acceleration adjustment section 47 adjusts the individual allowable acceleration by using a correction coefficient preset according to the posture holding state, for example, and outputs the individual allowable acceleration adjusted to the individual allowable acceleration integration section 48.

The individual allowable acceleration integration section 48 executes integration processing on the individual allowable acceleration provided from the individual allowable acceleration adjustment section 47, and sets the lowest individual allowable acceleration as the moving body allowable acceleration for each direction.

Figure 8:
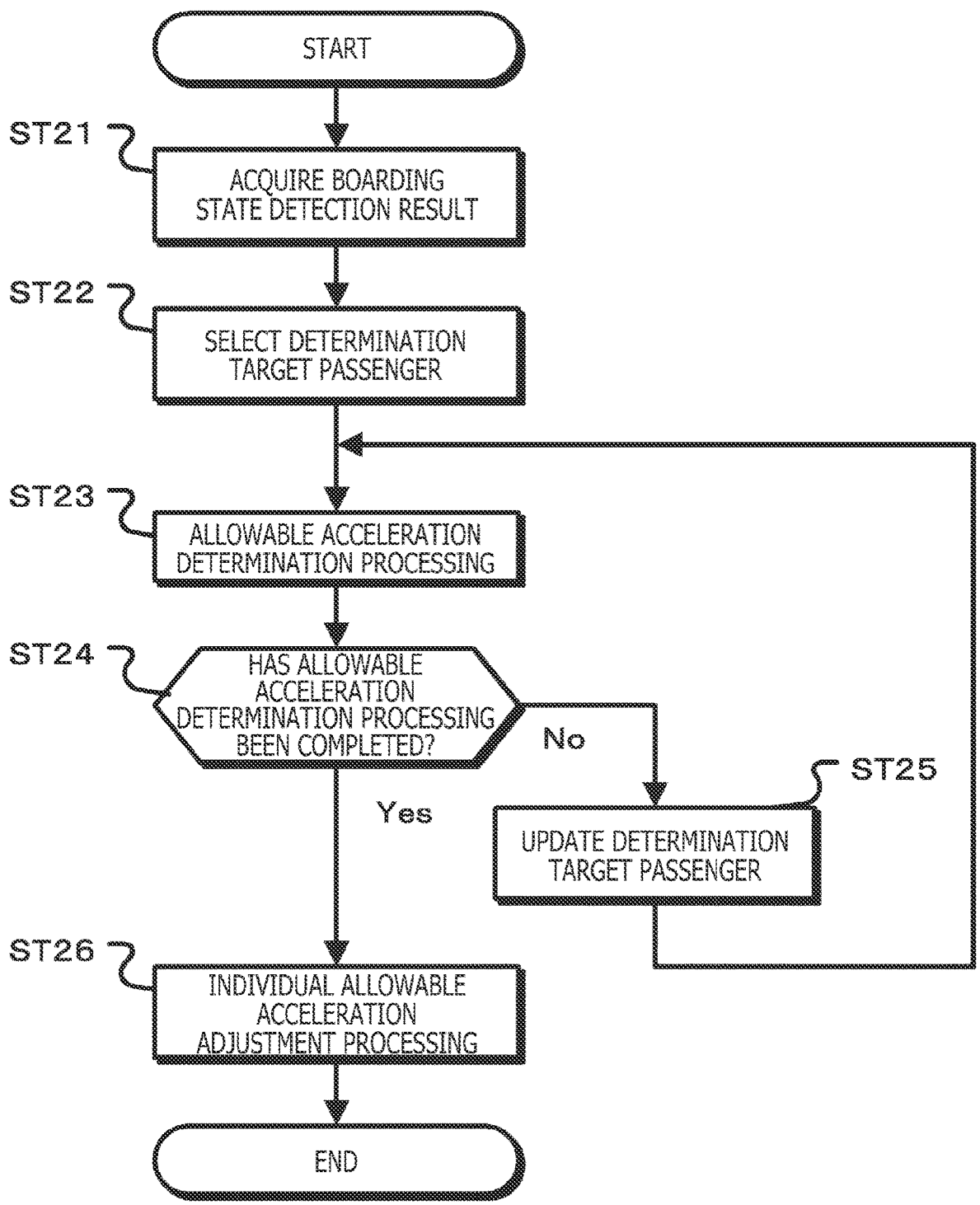
FIG. 8 is a flowchart illustrating an operation of the second embodiment.

FIG. 8 is a flowchart illustrating an operation of the second embodiment. Note that the flowchart depicts allowable acceleration setting processing in FIG. 2.

In step ST21, the allowable acceleration setting section acquires a boarding state detection result. The allowable acceleration setting section 40-2 acquires detection information indicating the boarding state detected for each passenger by the boarding state detection section 30, and proceeds to step ST22.

In step ST22, the allowable acceleration setting section selects a determination target passenger. The allowable acceleration setting section 40-2 selects, as the determination target passenger, a passenger for whom the individual allowable acceleration has not been determined, and proceeds to step ST23.

In step ST23, the allowable acceleration setting section executes allowable acceleration determination processing. The allowable acceleration setting section 40-2 uses the conversion tables stored in the conversion table storage section 41, to determine the individual allowable acceleration according to the boarding state of the determination target passenger, and proceeds to step ST24.

In step ST24, the allowable acceleration setting section determines whether the determination processing for each passenger has been completed. The allowable acceleration setting section 40-2 proceeds to step ST25 in a case where the individual allowable acceleration has not been determined for any of the passengers, but proceeds to step ST26 in a case where the individual allowable acceleration has been determined for all the passengers.

In step ST25, the allowable acceleration setting section updates the determination target passenger. The allowable acceleration setting section 40-2 selects, as a new determination target passenger, a passenger for whom the individual allowable acceleration has not been determined, and returns to step ST23.

The allowable acceleration setting section proceeds from step ST24 to step ST26 and executes individual allowable acceleration adjustment processing. The allowable acceleration setting section 40-2 adjusts, according to the posture holding state of each passenger, the individual allowable acceleration set for the passenger by the processing up to step ST25. For example, the allowable acceleration setting section 40-2 increases the individual allowable acceleration corresponding to passengers grabbing, for example, the stanchion, the strap, or the like, and ends the individual allowable acceleration determination processing.

Subsequently, the allowable acceleration setting section 40-2 performs integration on the individual allowable acceleration determined for the respective passengers by the processing from step ST21 to step ST26, and sets the moving body allowable acceleration. For example, the allowable acceleration setting section 40-2 selects the acceleration having the lowest value among the values of the individual allowable acceleration set for the respective passengers for each direction, and sets the selected acceleration as the moving body allowable acceleration.

The processing as described above allows the safety of the passengers to be improved as is the case with the first embodiment. Furthermore, the allowable acceleration can be set taking into account the posture holding state as well as the position and posture of the passenger. This allows the acceleration to be prevented from being limited more than necessary.

1-3. Third Embodiment

Now, a third embodiment will be described. In the third embodiment, described is a case of using not only the detection result for the boarding state, but also a temporal change in allowable acceleration.

Figure 9:
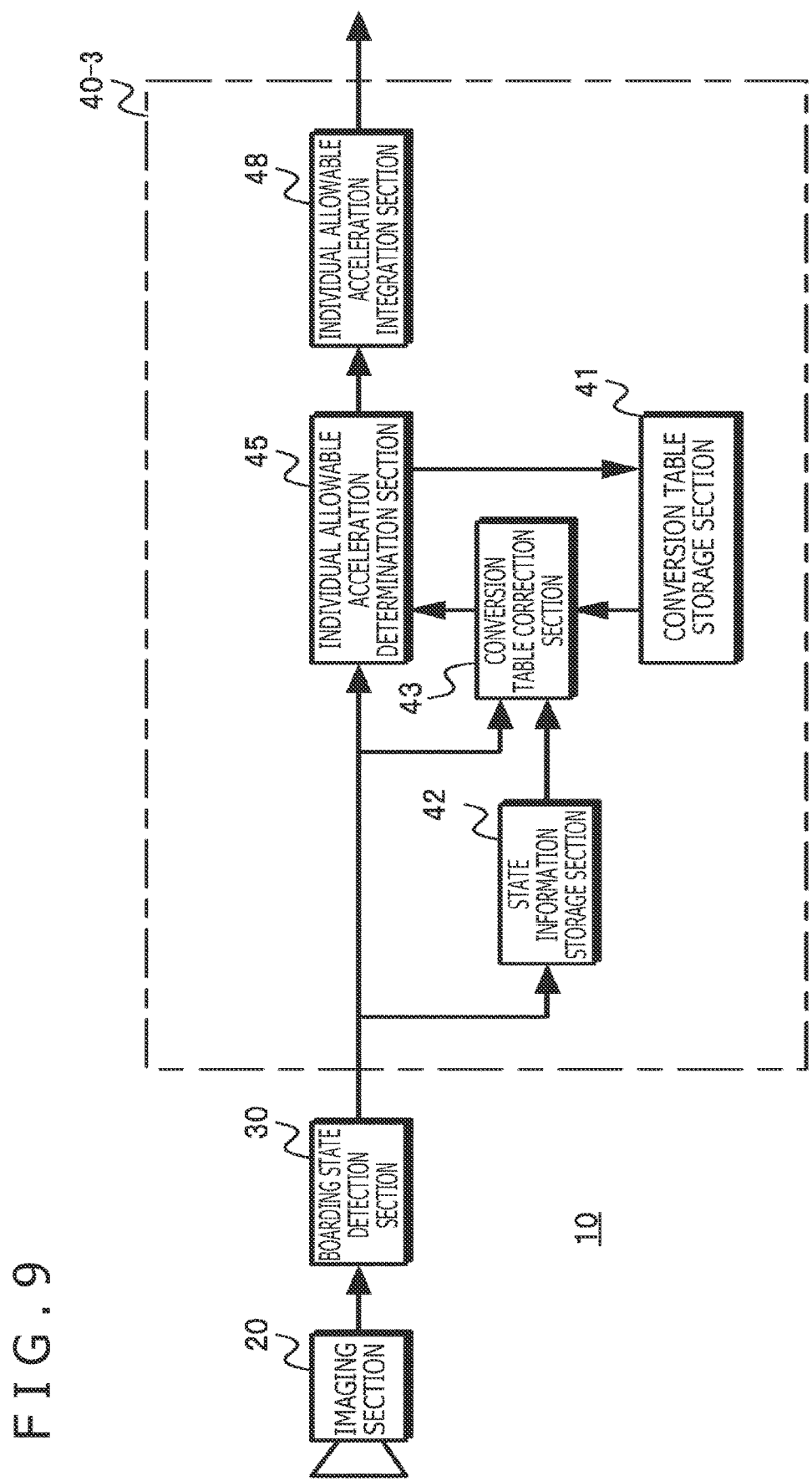
FIG. 9 is a diagram illustrating a configuration of a third embodiment of the information processing apparatus.

FIG. 9 illustrates the configuration of the third embodiment of the information processing apparatus. The information processing apparatus 10 includes the imaging section 20, the boarding state detection section 30, and an allowable acceleration setting section 40-3. Further, the allowable acceleration setting section 40-3 includes the conversion table storage section 41, a state information storage section 42, a conversion table correction section 43, the individual allowable acceleration determination section 45, and the individual allowable acceleration integration section 48.

The conversion table storage section 41 stores conversion tables indicating allowable acceleration based on the boarding state. For example, stored is the conversion table that uses, as a parameter, the boarding state detected for each passenger by the boarding state detection section 30, to indicate allowable acceleration corresponding to parameter values.

The state information storage section 42 stores the detection result from the boarding state detection section 30. The conversion table correction section 43 corrects the conversion table according to a temporal change in boarding state on the basis of the boarding state detection result provided from the boarding state detection section 30 and a past boarding state detection result stored in the state information storage section 42. For example, in a case where the position or posture of the passenger is subjected to a change more significant than a predetermined change, the conversion table correction section 43 corrects the conversion table in such a manner as to reduce the allowable acceleration determined according to the parameter value.

The individual allowable acceleration determination section 45 determines, for each passenger, the individual allowable acceleration corresponding to the detection result for the boarding state, on the basis of the conversion table corrected by the conversion table correction section 43. The individual allowable acceleration determination section 45 outputs the determination result for the individual allowable acceleration for each passenger to the individual allowable acceleration integration section 48.

The individual allowable acceleration integration section 48 executes integration processing on the individual allowable acceleration provided from the individual allowable acceleration determination section 45, and sets the lowest individual allowable acceleration as the moving body allowable acceleration for each direction.

Figure 10:
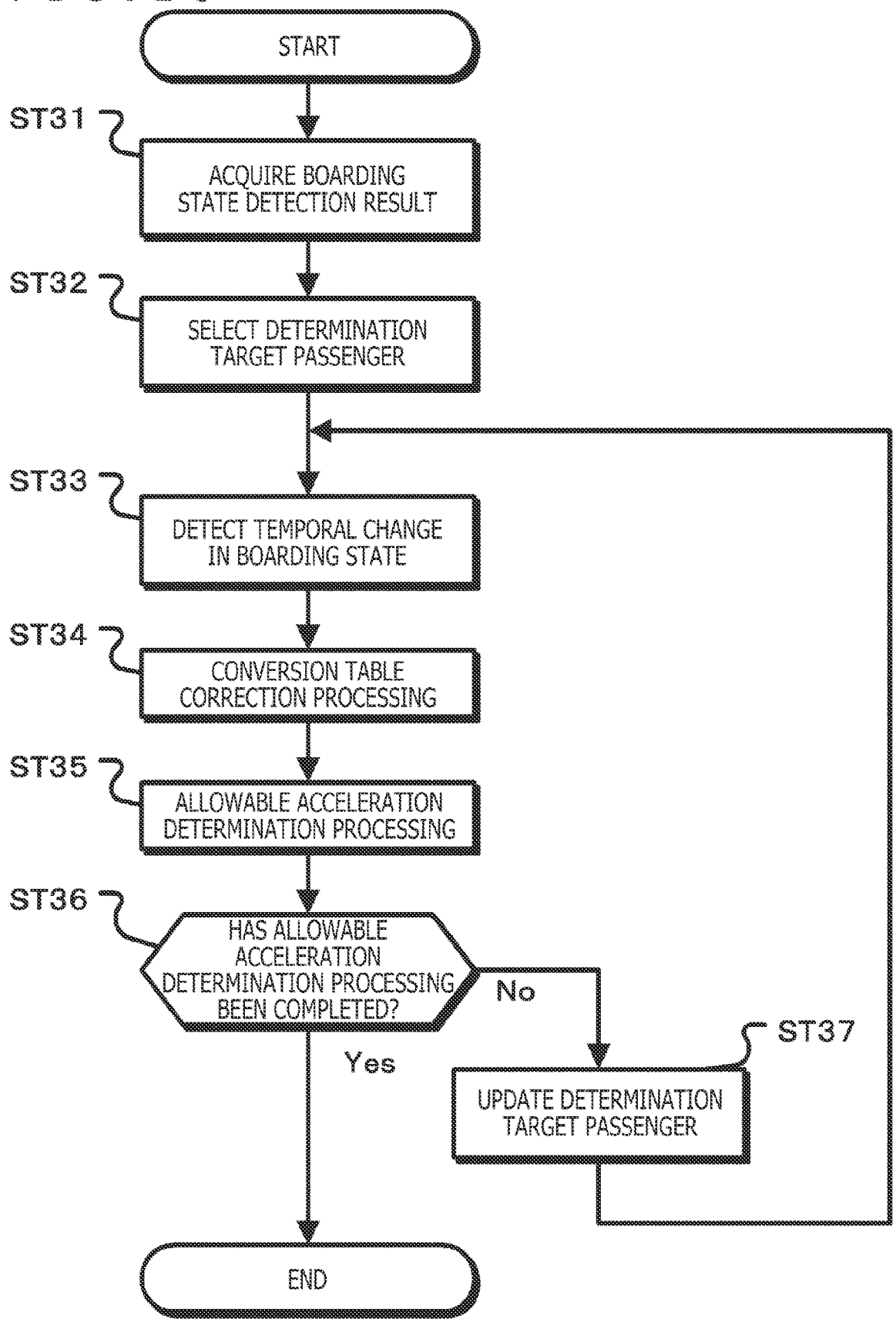
FIG. 10 is a flowchart illustrating an operation of the third embodiment.

FIG. 10 is a flowchart illustrating an operation of the third embodiment. Note that the flowchart depicts the allowable acceleration setting processing in FIG. 2.

In step ST31, the allowable acceleration setting section acquires a boarding state detection result. The allowable acceleration setting section 40-3 acquires detection information indicating the boarding state detected for each passenger by the boarding state detection section 30, and proceeds to step ST32.

In step ST32, the allowable acceleration setting section selects a determination target passenger. The allowable acceleration setting section 40-3 selects, as the determination target passenger, a passenger for whom the individual allowable acceleration has not been determined, and proceeds to step ST33.

In step ST33, the allowable acceleration setting section detects a temporal change in boarding state. The allowable acceleration setting section 40-3 detects a temporal change in boarding state on the basis of the boarding state detection result acquired in step ST31 and a detection result for the boarding state acquired in the past, and proceeds to step ST34.

In step ST34, the allowable acceleration setting section executes conversion table correction processing. The allowable acceleration setting section 40-3 corrects the conversion table on the basis of a temporal change in boarding state detected in step ST33. The allowable acceleration setting section 40-3 corrects the conversion table such that, in a case where the position or posture of the passenger is subjected to a change more significant than the predetermined change, for example, the allowable acceleration determined according to the parameter value decreases, and proceeds to step ST35.

In step ST35, the allowable acceleration setting section executes allowable acceleration determination processing. The allowable acceleration setting section 40-3 uses the conversion table corrected in step ST34, to determine the individual allowable acceleration corresponding to the boarding state of the determination target passenger, and proceeds to step ST36.

In step ST36, the allowable acceleration setting section determines whether the determination processing for each passenger has been completed. The allowable acceleration setting section 40-3 proceeds to step ST37 in a case where the individual allowable acceleration has not been determined for any of the passengers, but ends the individual allowable acceleration determination processing in a case where the individual allowable acceleration has been determined for all the passengers.

In step ST37, the allowable acceleration setting section updates the determination target passenger. The allowable acceleration setting section 40-3 selects, as a new determination target passenger, a passenger for whom the individual allowable acceleration has not been determined, and returns to step ST33.

Subsequently, the allowable acceleration setting section 40-3 performs integration on the individual allowable acceleration determined for the respective passengers by the processing from step ST31 to step ST37, and sets the moving body allowable acceleration. For example, the allowable acceleration setting section 40-3 selects the acceleration having the lowest value among the values of the individual allowable acceleration set for the respective passengers for each direction, and sets the selected acceleration as the moving body allowable acceleration.

Figures 11A, 11B, 11C:
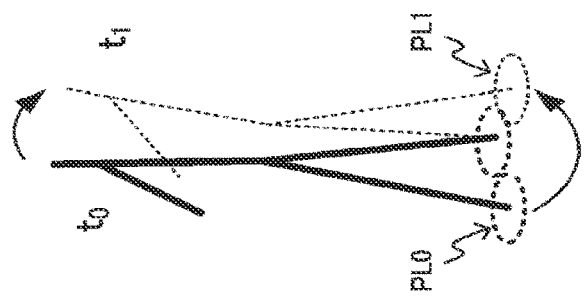
FIGS. 11A, 11B, and 11C depict diagrams illustrating an operation example of the third embodiment.

FIGS. 11A, 11B, and 11C depict an operation example of the third embodiment. In FIGS. 11A, 11B, an 11C, FIG. 11A illustrates a conversion table stored in the conversion table storage section 41. In FIGS. 11A, 11B, an 11C, FIG. 11B illustrates a temporal change in boarding state. When a point of time t0 changes to a point of time t1, for example, a change in acceleration causes a change in foot position that is more significant than a predetermined change, and a position PL0 changes to a position PL1. In this case, the conversion table correction section 43 corrects the conversion table to suppress a change in boarding state, and corrects the conversion table to a conversion table depicted in FIG. 11C including lower allowable acceleration as compared to that in the conversion table depicted in FIG. 11A. Consequently, in a case where the boarding state changes significantly over time, the allowable acceleration is reduced to allow the safety of the passengers to be improved.

1-4. Fourth Embodiment

Now, a fourth embodiment will be described. In the fourth embodiment, described is a case in which the allowable acceleration is set using a conversion table corresponding to a moving situation of the moving body.

Figure 12:
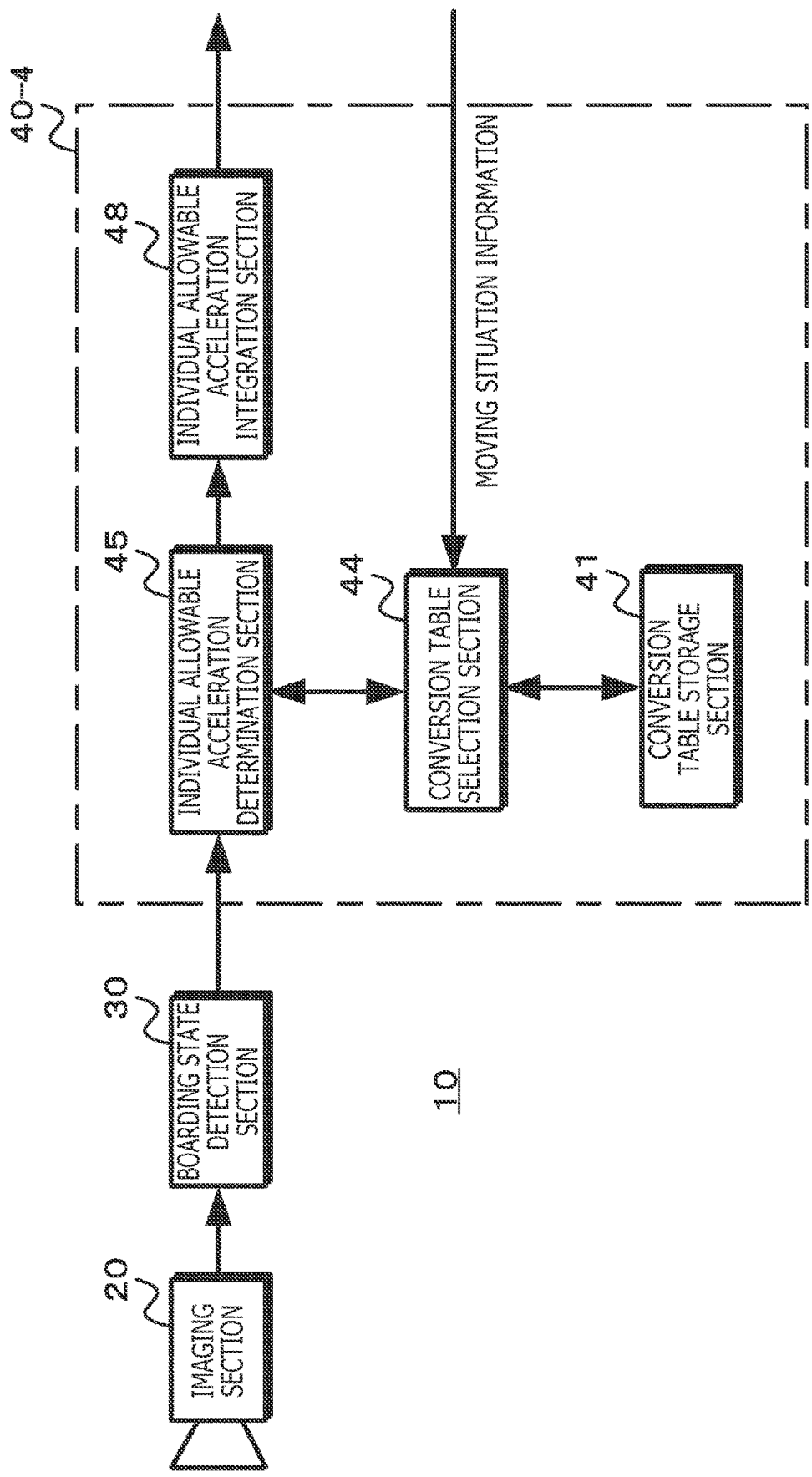
FIG. 12 is a diagram illustrating a configuration of a fourth embodiment of the information processing apparatus.

FIG. 12 illustrates a configuration of the fourth embodiment of the information processing apparatus. The information processing apparatus 10 includes the imaging section 20, the boarding state detection section 30, and an allowable acceleration setting section 40-4. Further, the allowable acceleration setting section 40-4 includes the conversion table storage section 41, a conversion table selection section 44, the individual allowable acceleration determination section 45, and the individual allowable acceleration integration section 48.

The conversion table storage section 41 stores conversion tables indicating allowable acceleration based on the boarding state. For example, stored is the conversion table that uses, as a parameter, the boarding state detected for each passenger by the boarding state detection section 30, to indicate allowable acceleration corresponding to parameter values.

The conversion table selection section 44 is provided with moving situation information indicating a moving situation of the moving body. As the moving situation information, at least either static or dynamic information may be used. As the static information, for example, information indicating a route for the moving body or the like is used. Further, the dynamic information includes, for example, information indicating at least any one of the service situation or service time of the moving body, the frequency of jolts of the moving body, weather, an in-vehicle crowded situation, and a traffic jam situation or other information.

The conversion table selection section 44 acquires, from the conversion table storage section 41, a conversion table corresponding to the moving situation of the moving body, and outputs the conversion table to the individual allowable acceleration determination section 45. For example, the conversion table selection section 44 outputs, to the individual allowable acceleration determination section 45, a conversion table corresponding to the moving route for the moving body. Further, the conversion table selection section 44 switches the conversion table in response to a change in service situation, weather, or the like.

The individual allowable acceleration determination section 45 determines, for each passenger, the individual allowable acceleration corresponding to the detection result for the boarding state, on the basis of the conversion table provided from the conversion table selection section 44. The individual allowable acceleration determination section 45 outputs the determination result for the individual allowable acceleration for each passenger to the individual allowable acceleration integration section 48.

The individual allowable acceleration integration section 48 executes integration processing on the individual allowable acceleration provided from the individual allowable acceleration adjustment section 47, and sets the lowest individual allowable acceleration as the moving body allowable acceleration for each direction.

Figure 13:
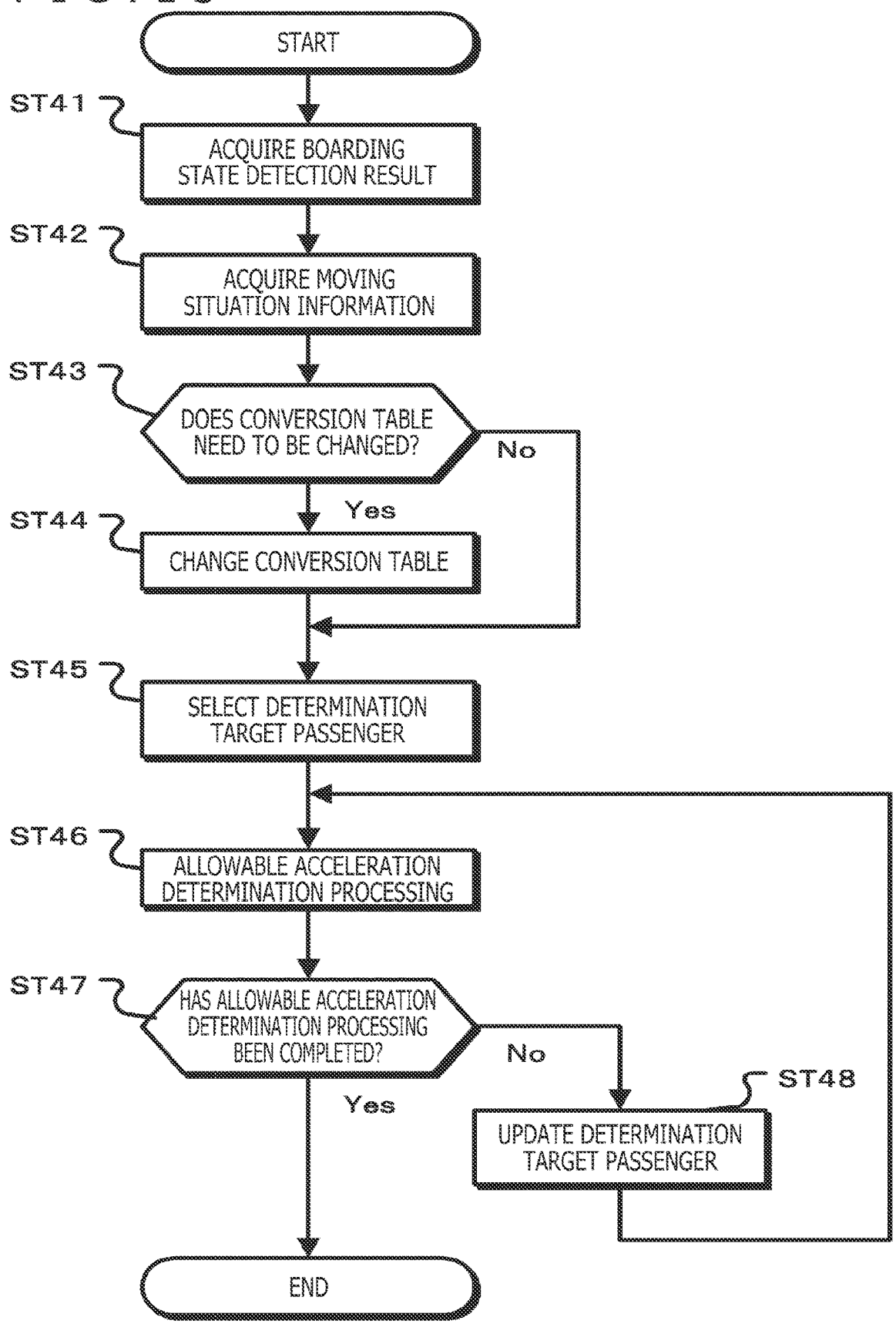
FIG. 13 is a flowchart illustrating an operation of the fourth embodiment.

FIG. 13 is a flowchart illustrating an operation of a fourth embodiment. Note that the flowchart depicts the allowable acceleration setting processing in FIG. 2.

In step ST41, the allowable acceleration setting section acquires a boarding state detection result. The allowable acceleration setting section 40-4 acquires detection information indicating the boarding state detected for each passenger by the boarding state detection section 30, and proceeds to step ST42.

In step ST42, the allowable acceleration setting section acquires moving situation information. The allowable acceleration setting section 40-4 acquires, from an external source, moving situation information indicating at least one of the moving route of the moving body, moving environment thereof, and the like, and proceeds to step ST43.

In step ST43, the allowable acceleration setting section determines whether the conversion table needs to be changed. The allowable acceleration setting section 40-4 determines whether the conversion table needs to be changed, on the basis of the moving situation information acquired in step ST42. The allowable acceleration setting section 40-4 proceeds to step ST44 in a case of determining that the conversion table needs to be changed, but proceeds to step ST45 in a case of determining that the conversion table need not be changed.

In step ST44, the allowable acceleration setting section changes the conversion table. The allowable acceleration setting section 40-4 selects one of the conversion tables stored in the conversion table storage section 41 that corresponds to the moving situation information acquired in step ST42, and proceeds to step ST45.

In step ST45, the allowable acceleration setting section selects a determination target passenger. The allowable acceleration setting section 40-4 selects, as the determination target passenger, a passenger for whom the individual allowable acceleration has not been determined, and proceeds to step ST46.

In step ST46, the allowable acceleration setting section executes allowable acceleration determination processing.

The allowable acceleration setting section 40-4 uses the conversion tables stored in the conversion table storage section 41, to determine the individual allowable acceleration corresponding to the boarding state of the determination target passenger, and proceeds to step ST47.

In step ST47, the allowable acceleration setting section determines whether the determination processing for each passenger has been completed. The allowable acceleration setting section 40-4 proceeds to step ST48 in a case where the individual allowable acceleration has not been determined for any of the passengers, but ends the individual allowable acceleration determination processing in a case where the individual allowable acceleration has been determined for all the passengers.

In step ST48, the allowable acceleration setting section updates the determination target passenger. The allowable acceleration setting section 40-4 selects, as a new determination target passenger, a passenger for whom the individual allowable acceleration has not been determined, and returns to step ST46.

Subsequently, the allowable acceleration setting section 40-4 performs integration on the individual allowable acceleration determined for the respective passengers by the processing from step ST41 to step ST48, and sets the moving body allowable acceleration. For example, the allowable acceleration setting section 40-4 selects the acceleration having the lowest value among the values of the individual allowable acceleration set for the respective passengers for each direction, and sets the selected acceleration as the moving body allowable acceleration.

The processing as described above sets the moving body allowable acceleration according to the moving situation of the moving body as well as the boarding states of the passengers, thus allowing the safety of the passengers to be improved.

2. Movement Control Apparatus

Now, a movement control apparatus using the information processing apparatus of the present technique will be described. As described above, the information processing apparatus sets the moving body allowable acceleration on the basis of the boarding states of the passengers in the moving body, and the movement control apparatus controls movement of the moving body in such a manner as to avoid exceeding the moving body allowable acceleration set by the information processing apparatus.

Figure 14:
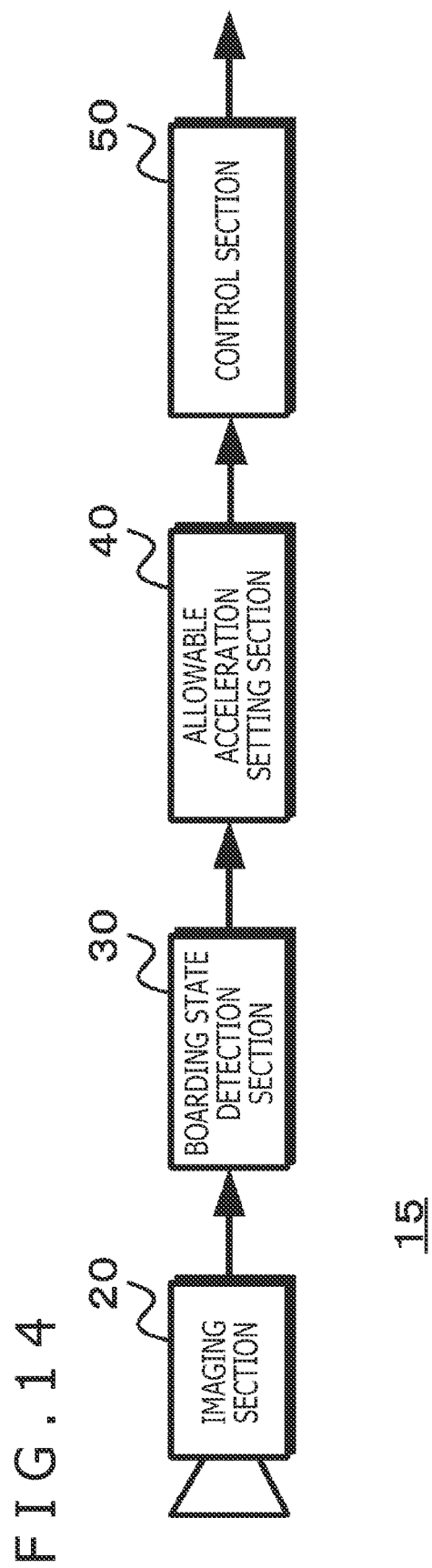
FIG. 14 is a diagram illustrating a configuration of a movement control apparatus.

FIG. 14 illustrates a configuration of the movement control apparatus. Note that FIG. 14 depicts a case in which a movement control apparatus 15 is provided not only with a control section 50 configured to perform movement control at the moving body allowable acceleration set by an allowable acceleration setting section 40 but also with an imaging section 20 configured to image a passenger in the moving body in order to detect the boarding state of the passenger in the moving body and a boarding state detection section 30 configured to detect the boarding state of the passenger on the basis of an image acquired by the imaging section 20 but the movement control apparatus of the present technique may include only the control section 50.

The imaging section 20 includes an imaging lens that forms an optical image of a subject on an imaging surface of an imaging element, the imaging element such as a CMOS (Complementary Metal Oxide Semiconductor) or a CCD (Charge Coupled Device) which performs photoelectric conversion to generate an image signal corresponding to the optical image, an image signal processing section configured to execute camera signal processing on the image signal generated by the imaging element, to generate an image signal indicating a captured image of high image quality, and the like. The imaging section 20 generates an image signal of a captured image depicting the passenger in the moving body and outputs the image signal to the boarding state detection section 30.

The boarding state detection section 30 uses the image signal generated by the imaging section 20, to detect the boarding state of the passenger for each passenger included in the captured image. The boarding state detection section 30 matches, for example, feature points and the like extracted from the captured image against the shape of an object defined by model data and the like, to detect, as the boarding state, the posture of the passenger or the posture of the passenger and the position of the passenger in the moving body. Further, the boarding state detection section 30 may use machine learning or the like to detect the boarding state of the passenger on the basis of the captured image. The boarding state detection section 30 outputs a detection result for the boarding state to the allowable acceleration setting section 40.

The allowable acceleration setting section 40 sets the moving body allowable acceleration on the basis of the boarding state detected by the boarding state detection section 30. As described above, the allowable acceleration setting section 40, for example, determines the allowable acceleration for each passenger in the moving body, performs integration on the allowable acceleration determined for the respective passengers, sets the resultant as the moving body allowable acceleration, and outputs the moving body allowable acceleration to the control section 50.

The control section 50 performs operation of the moving body, for example, selection and change of the moving route, on the basis of the moving body allowable acceleration set by the allowable acceleration setting section 40. Note that the configuration and operation of the control section 50 will be described in the embodiments.

Figure 15:
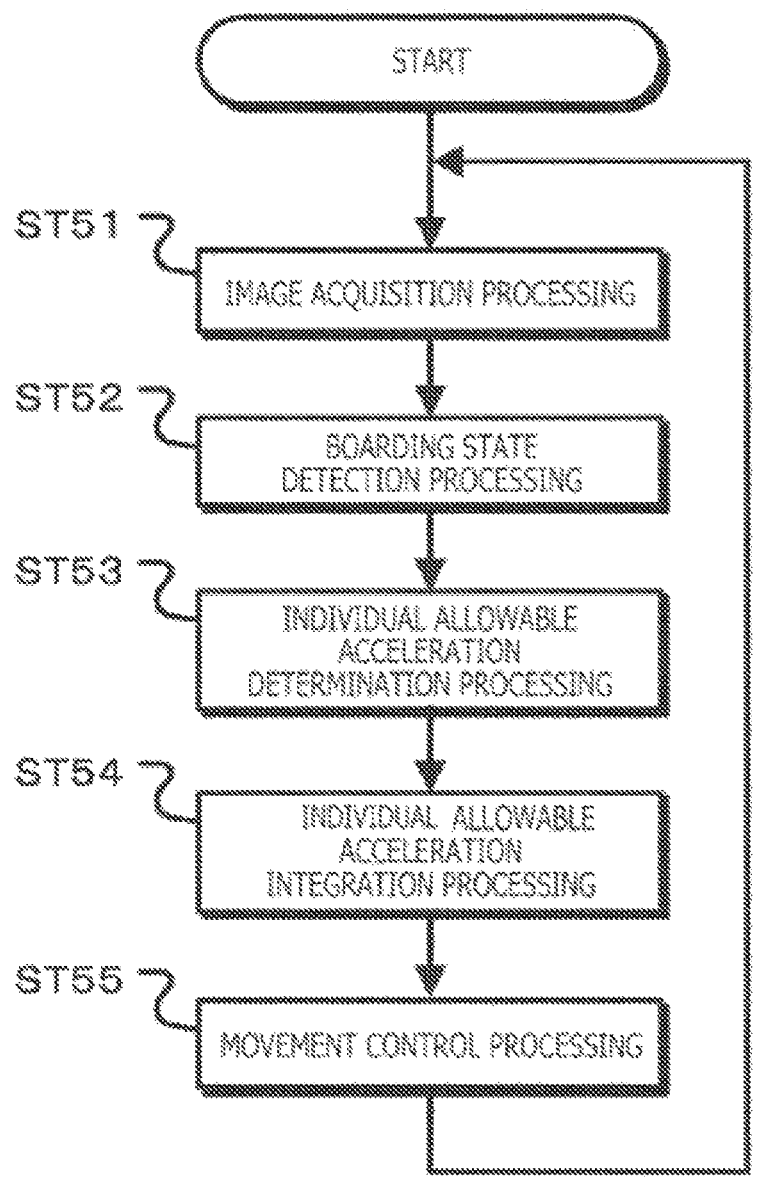
FIG. 15 is a flowchart illustrating an operation of the movement control apparatus.

FIG. 15 is a flowchart illustrating an operation of the movement control apparatus. In step ST51, the movement control apparatus executes image acquisition processing. The movement control apparatus 15 acquires a captured image of the passenger in the moving body, and proceeds to step ST52.

In step ST52, the movement control apparatus 15 executes boarding state detection processing. The movement control apparatus 15 determines, for each passenger, the boarding state of the passenger on the basis of the captured image acquired in step ST51, and proceeds to step S53.

In step ST53, the information processing apparatus 10 executes the individual allowable acceleration determination processing. The information processing apparatus 10 determines the individual allowable acceleration for each passenger on the basis of the boarding state detected in step ST52, and proceeds to step ST54.

In step ST54, the information processing apparatus 10 executes the individual allowable acceleration integration processing. The information processing apparatus 10 performs integration on the individual allowable acceleration determined for the respective passengers in step ST53, sets the moving body allowable acceleration, and proceeds to step ST55.

In step ST55, the movement control apparatus 15 executes movement control processing. The movement control apparatus 15 controls movement of the moving body on the basis of moving body allowable acceleration set in step ST53.

2-1. Configuration and Operation of Control Section

Figure 16:
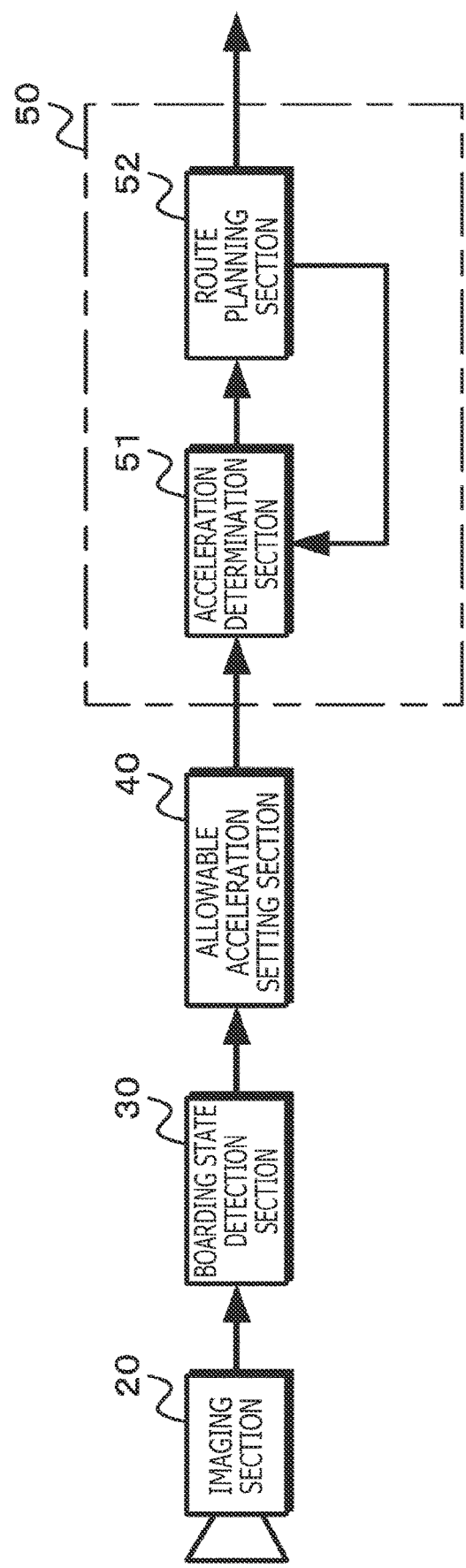
FIG. 16 is a diagram illustrating a configuration of an embodiment of a control section.

FIG. 16 illustrates a configuration of an embodiment of the control section. The control section 50 of the movement control apparatus 15 includes an acceleration determination section 51 and a route planning section 52.

The acceleration determination section 51 acquires acceleration information for each route (hereinafter referred to as "route acceleration information") from the route planning section 52, determines whether any portion of the route involves acceleration exceeding the moving body allowable acceleration set by the allowable acceleration setting section 40, and outputs a determination result to the route planning section 52. Note that the route acceleration information is information indicating the acceleration caused on the route when the moving body moves on the route.

The route planning section 52 includes route acceleration information for each route for the moving body. The route planning section 52 provides route acceleration information to the acceleration determination section 51, and sets, on the basis of a determination result provided from the acceleration determination section 51, as the moving route for the moving body, a route involving acceleration equal to or lower than the moving body allowable acceleration or a route involving acceleration that is least different from the moving body allowable acceleration in a case where none of the routes involve acceleration equal to or lower than the moving body allowable acceleration.

Figure 17:
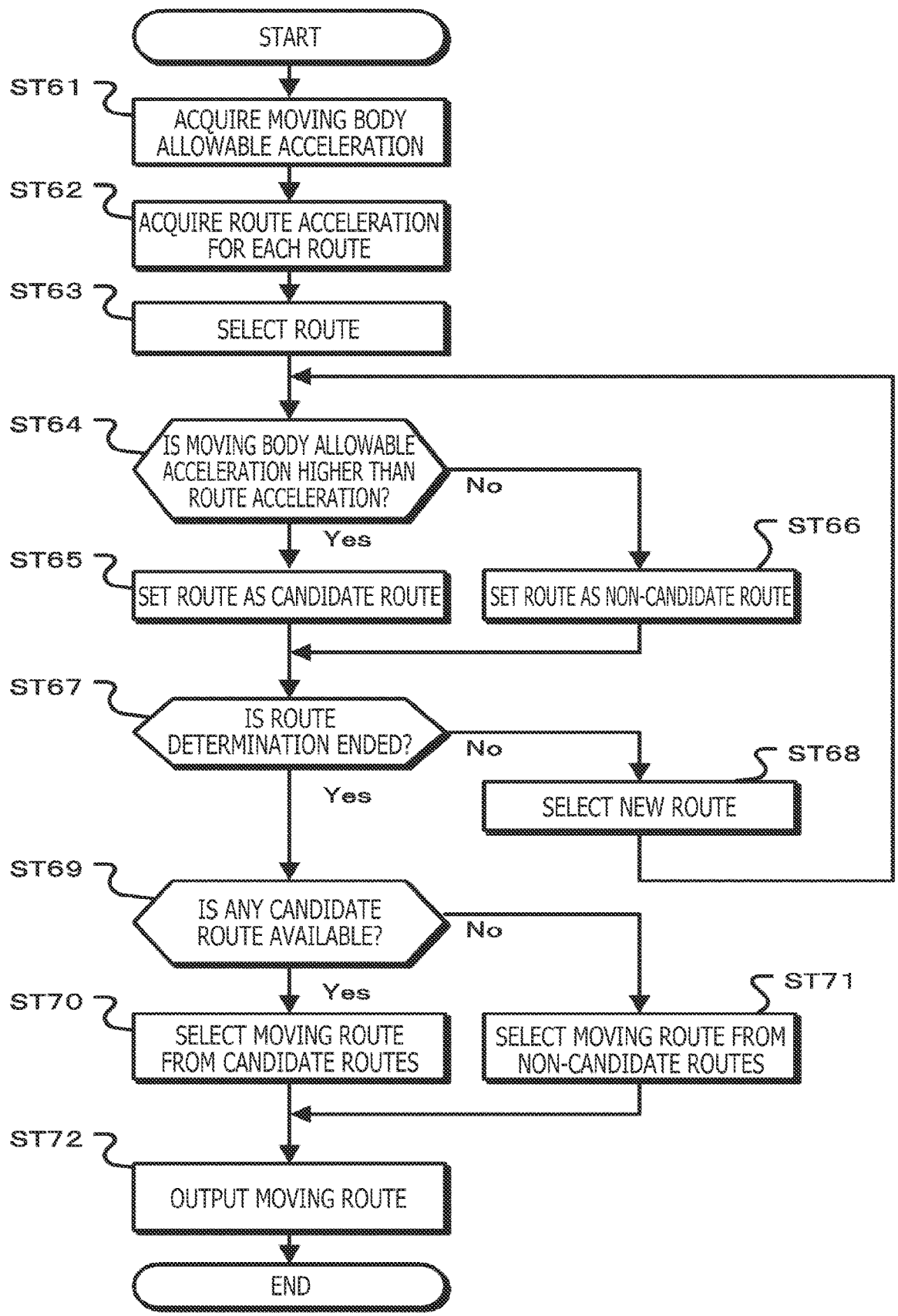
FIG. 17 is a flowchart illustrating an operation of an embodiment.

FIG. 17 is a flowchart illustrating an operation of an embodiment. Note that the flowchart depicts movement control processing in FIG. 15.

In step ST61, the control section acquires the moving body allowable acceleration. The control section 50 acquires the moving body allowable acceleration set by the allowable acceleration setting section 40, and proceeds to step ST62.

In step ST62, the control section acquires route acceleration information for each route. The acceleration determination section 51 of the control section 50 acquires the route acceleration information for each route from the route planning section 52, and proceeds to step ST63.

In step ST63, the control section selects a route. The acceleration determination section 51 of the control section 50 selects a route for which route acceleration information is indicated, and proceeds to step ST64.

In step ST64, the control section determines whether the moving body allowable acceleration is exceeded. The acceleration determination section 51 of the control section 50 determines whether the moving body allowable acceleration is exceeded during movement on the selected route, on the basis of the route acceleration information for the route selected in step ST63. The acceleration determination section 51 proceeds to step ST65 in a case of determining that the route acceleration does not exceed the moving body allowable acceleration, but proceeds to step ST66 in a case of determining that the route acceleration exceeds the moving body allowable acceleration.

In step ST65, the control section sets the selected route as a candidate route. The acceleration determination section 51 of the control section 50 sets, as a candidate route, a route involving acceleration not exceeding the moving body allowable acceleration, and proceeds to step ST67.

In step ST66, the control section sets the selected route as a non-candidate route. The acceleration determination section 51 of the control section 50 sets, as a non-candidate route, a route involving acceleration exceeding the moving body allowable acceleration, and proceeds to step ST67.

In step ST67, the control section determines whether the route determination is ended. In a case where each route has been determined to be a candidate route or a non-candidate route, the acceleration determination section 51 of the control section 50 determines that the route determination is ended, and proceeds to step ST69. In a case where any of the routes has not been determined to be a candidate route or a non-candidate route, the acceleration determination section 51 determines that the route determination is not ended, and proceeds to step ST68.

In step ST68, the control section selects a new route. The acceleration determination section 51 of the control section 50 newly selects a route that has not been determined to be a candidate route or a non-candidate route, and returns to step ST64.

In step ST69, the control section determines whether any candidate route is available. The route planning section 52 of the control section 50 proceeds to step ST70 in a case of determining that a candidate route is available, but proceeds to step ST71 in a case of determining that no candidate route is available.

In step ST70, the control section selects a moving route from candidate routes. On the basis of the route acceleration of each candidate route, the route planning section 52 of the control section 50 selects a candidate route with the lowest route acceleration, as a moving route. Further, in a case where, on the basis of the route acceleration of each candidate route and the moving body allowable acceleration, the route planning section 52 selects, as the moving route, a candidate route with the smallest difference between the route acceleration and the moving body allowable acceleration, then the acceleration of the moving body can be prevented from being excessively limited. The route planning section 52 selects the moving route, and proceeds to step ST72.

In step ST71, the control section selects a moving route from non-candidate routes. On the basis of the route acceleration of each non-candidate route, the route planning section 52 of the control section 50 selects a non-candidate route with the lowest route acceleration, as a moving route, and proceeds to step ST72.

In step ST72, the control section outputs the moving route. The route planning section 52 of the control section 50 notifies an external facility of the moving route set in step ST70 or step ST71. Further, the route planning section 52 may output, along with the moving route, moving route identification information enabling determination of whether the moving route is a candidate route or a non-candidate route, along with the moving route.

The processing as described above allows automatic selection of a route enabling the safety of the passengers to be ensured. Further, in a case where the moving route is indicated to be a non-candidate route on the basis of the moving route identification information, the acceleration of the moving body is made lower than the route acceleration to control movement.

Figure 18:
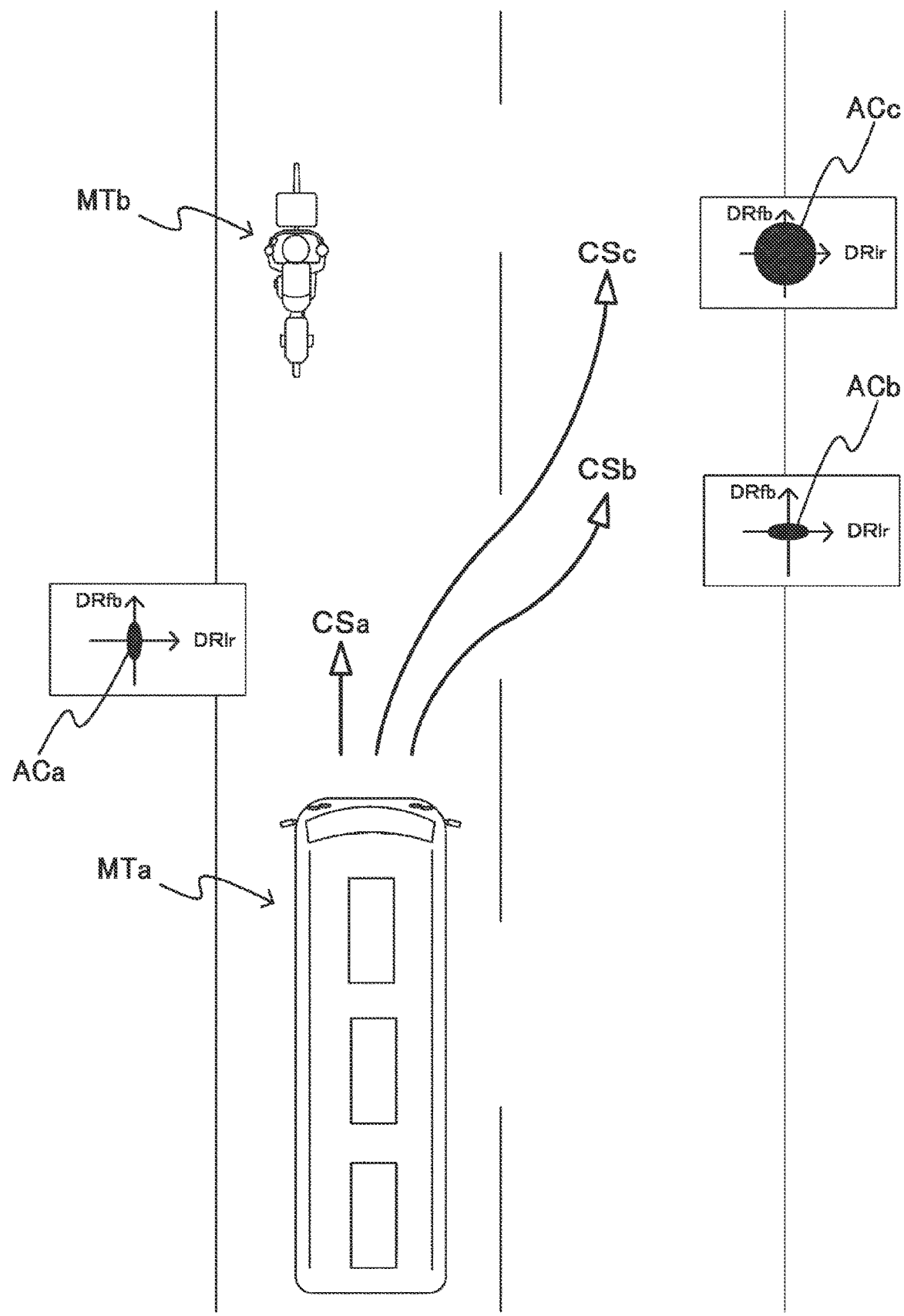
FIG. 18 is a diagram illustrating a route selection operation.

FIG. 18 illustrates a route selection operation based on the set allowable acceleration, and depicts a case in which a bus MTa avoids a bicycle MTb traveling in front of the bus MTa. In a case of moving body allowable acceleration ACa in which allowable acceleration in a lateral direction DR1r is lower than allowable acceleration in a moving direction DRfb corresponding to a front-back direction, an avoiding operation in which the acceleration in the lateral direction DR1r is limited, for example, the speed is reduced without effecting movement in the lateral direction and the bus follows the bicycle as illustrated by a route CSa. In a case of moving body allowable acceleration ACb in which the allowable acceleration in the moving direction (front-back direction) DRfb is lower than the allowable acceleration in the lateral direction DR1r, an avoiding operation in which the allowable acceleration in the moving direction (front-back direction) DRfb is limited, for example, the course is changed without acceleration or deceleration and the next lane is used to avoid the bicycle as illustrated by a route CSb. Further, in a case of moving body allowable acceleration ACc in which the allowable acceleration is high in the moving direction (front-back direction) DRfb and the lateral direction DR1r, an avoiding operation is performed with no limitation on the allowable acceleration in the moving direction (front-back direction) DRfb or the lateral direction DR1r, for example, the course is changed with acceleration and the next lane is used to avoid the bicycle as illustrated by a route CSc.

Further, on the basis of the moving route identification information, in a case where the routes CSa to CSc are candidate routes, the avoiding operation as described above is performed, and in a case where the routes CSa to CSc are non-candidate routes, an avoiding operation may be performed earlier than the performance of the above-described avoiding operation, and the acceleration may be suppressed in the moving direction (front-back direction) DRfb and the lateral direction DR1r.

Thus, in a case where, on the basis of the boarding states of the passengers in the moving body, the moving body allowable acceleration is set and movement of the moving body is controlled in such a manner as to avoid exceeding the set moving body allowable acceleration, a safe and optimum route can be selected in consideration of the boarding states of the passengers, and the moving body can move on the route.

3. Other Embodiments

The above-described information processing apparatus is not limited to the configurations of the embodiments, and may have a configuration corresponding to a combination of the embodiments. Further, the allowable acceleration setting section 40 in the movement control apparatus may be configured according to any of the embodiments of the above-described information processing apparatus or may have a configuration corresponding to a combination of the embodiments as long as the allowable acceleration setting section 40 can set the moving body allowable acceleration. For example, the conversion table may be switched according to the holding states of the passengers, and the individual allowable acceleration may be adjusted according to the moving situation of the moving body.

Further, in the illustrated example, the control section 50 in the above-described moving body control system selects a route in such a manner as to avoid exceeding the moving body allowable acceleration. However, the control section 50 may control speed, steering, or the like such that the moving body avoids exceeding the moving body allowable acceleration.

Further, the processing depicted in FIG. 2 and FIG. 15 is not limited to the case where a captured image is acquired and setting of the moving body allowable acceleration is completed before the next captured image is acquired. Acquisition of the next captured image or the like may be started before the setting of the moving body allowable acceleration is completed.

4. Applied Example

Now, an applied example of the movement control apparatus will be described. FIG. 19 is a block diagram depicting a general configuration example of functions of a vehicle control system 100 that is an example of a moving body control system to which the present technique may be applied.

Note that, in the following description, in a case where a vehicle in which the vehicle control system 100 is provided is to be distinguished from another vehicle, the first vehicle is referred to as the subject or the subject vehicle.

The vehicle control system 100 includes an input section 101, a data acquisition section 102, a communication section 103, in-vehicle equipment 104, an output control section 105, an output section 106, a drive system control section 107, a drive system 108, a body system control section 109, a body system 110, a storage section 111, and a self-driving control section 112. A communication network 121 is used to interconnect the input section 101, the data acquisition section 102, the communication section 103, the output control section 105, the drive system control section 107, the body system control section 109, the storage section 111, and the self-driving control section 112. The communication network 121 includes an in-vehicle communication network or bus in conformity with an optional standard, for example, a CAN (Controller Area Network), a LIN (Local Interconnect Network), a LAN (Local Area Network), FlexRay (registered trademark), or the like. Note that the sections of the vehicle control system 100 may be directly connected to each other without the communication network 121.

Note that the description of the communication network 121 is hereinafter omitted in a case where the sections of the vehicle control system 100 communicate with one another via the communication network 121. For example, in a case where the input section 101 and the self-driving control section 112 communicate with each other via the communication network 121, this is simply described as the input section 101 and the self-driving control section 112 communicating with each other.

The input section 101 includes an apparatus used by a passenger to input various kinds of data, instructions, and the like. For example, the input section 101 includes operation devices such as a touch panel, buttons, a microphone, switches, and a lever, an operation device enabling input by a method other than manual operation that uses sound or gestures, and the like. Further, for example, the input section 101 may be a remote control apparatus using infrared rays or other radio waves, or external connection equipment such as mobile equipment or wearable equipment which is designed for operation of the vehicle control system 100. The input section 101 generates an input signal on the basis of data, an instruction, or the like input by a passenger, and provides the input signal to the sections of the vehicle control system 100.

The data acquisition section 102 includes, for example, various sensors configured to acquire data used for processing of the vehicle control system 100, and provides the acquired data to the sections of the vehicle control system 100.

For example, the data acquisition section 102 includes various sensors for detecting the state of the subject and the like. Specifically, for example, the data acquisition section 102 includes a gyro sensor, an acceleration sensor, an inertial measurement unit (IMU), a sensor detecting the operation amount of an accelerator pedal, the operation amount of a brake pedal, the steering angle of a steering wheel, the rotation speed of an engine, the rotation speed of a motor, or the rotation speed of wheels, and the like.

Further, for example, the data acquisition section 102 includes various sensors for detecting exterior information of the subject. Specifically, for example, the data acquisition section 102 includes an imaging apparatus such as a ToF (Time Of Flight) camera, a stereo camera, a monocular camera, an infrared camera, and any other camera. Further, for example, the data acquisition section 102 includes an environment sensor for detecting weather, a meteorological phenomenon, or the like and a surrounding information detection sensor for detecting objects around the subject. The environment sensor includes, for example, a raindrop sensor, a fog sensor, a daylight sensor, a snow sensor, and the like. The surrounding information detection sensor includes, for example, an ultrasonic sensor, a radar, a LiDAR (Light Detection and Ranging, Laser Imaging Detection and Ranging), a sonar, or the like.

Further, for example, the data acquisition section 102 includes various sensors for detecting the current location of the subject. Specifically, for example, the data acquisition section 102 includes a GNSS (Global Navigation Satellite System) receiver receiving GNSS signals from a GNSS satellite, or the like.

Further, for example, the data acquisition section 102 includes various sensors for detecting vehicle interior information. Specifically, for example, the data acquisition section 102 includes an imaging apparatus that images a driver, a biosensor that detects biological information regarding the driver, a microphone that collects sound in the vehicle interior, or the like. The biosensor is, for example, provided on a seating surface, at the steering wheel, or the like, and detects biological information regarding a seated passenger or the driver holding the steering wheel.

The communication section 103 communicates with the in-vehicle equipment 104 as well as various pieces of exterior equipment, a server, a base station, and the like to transmit data provided from the sections of the vehicle control system 100 or provide received data to the sections of the vehicle control system 100. Note that a communication protocol supported by the communication section 103 is not particularly limited to any kind and that the communication section 103 can also support a plurality of types of communication protocols.

For example, the communication section 103 performs wireless communication with the in-vehicle equipment 104, by wireless LAN, Bluetooth (registered trademark), NFC (Near Field Communication), or WUSB (Wireless USB), or the like. Further, for example, the communication section 103 performs wired communication with the in-vehicle equipment 104 via a connection terminal not illustrated (and a cable when necessary), by USB (Universal Serial Bus), HDMI (registered trademark) (High-Definition Multimedia Interface), MHL (Mobile High-definition Link), or the like.

Further, for example, the communication section 103 communicates with equipment (for example, an application server or a control server) present on an external network (for example, the Internet, a cloud network, or a provider-specific network) via a base station or an access point. Further, for example, the communication section 103 uses a P2P (Peer To Peer) technique to communicate with a terminal (for example, a terminal of a pedestrian or in a shop, or an MTC (Machine Type Communication) terminal) present near the subject. Moreover, for example, the communication section 103 performs V2X communication such as Vehicle to Vehicle communication, Vehicle to Infrastructure communication, Vehicle to Home communication, and Vehicle to Pedestrian communication. Further, for example, the communication section 103 includes a beacon reception section, and receives radio waves or electromagnetic waves transmitted from wireless stations and the like installed on roads, to acquire such information as the current location, traffic jams, traffic regulations, or the required length of time.

The in-vehicle equipment 104 includes, for example, mobile equipment or wearable equipment possessed by passengers, information equipment installed in or attached to the subject, a navigation apparatus for search for a route to any destination, and the like.

The output control section 105 controls output of various pieces of information to the passengers in the subject or to the exterior. For example, the output control section 105 generates an output signal including at least one of visual information (for example, image data) and audio information (for example, sound data), and provides the output signal to the output section 106, thereby controlling output of visual information and audio information from the output section 106. Specifically, for example, the output control section 105 synthesizes pieces of image data captured by different imaging apparatuses of the data acquisition section 102, to generate a plan-view image, a panorama image, or the like, and provides the output section 106 with an output signal including the generated image. Further, for example, the output control section 105 generates sound data including warning sound or a warning message for such danger as a collision, contact, entry into a danger zone, and the like, and provides the output section 106 with an output signal including the generated sound data.

The output section 106 includes an apparatus that can output visual information or audio information to the passengers in the subject or to the exterior. For example, the output section 106 includes a display apparatus, an instrument panel, an audio speaker, headphones, wearable devices such as eyeglass-shaped displays worn by the passengers, projectors, lamps, and the like. The display apparatus provided in the output section 106 may be, for example, an apparatus displaying visual information within the field of view of the driver, for example, a head-up display, a transmissive display, an apparatus with an AR (Augmented Reality) display function, and the like, as well as an apparatus with a normal display.

The drive system control section 107 generates and provides various control signals to the drive system 108 to control the drive system 108. Further, the drive system control section 107 performs, as necessary, notification of a control state of the drive system 108, for example, to the sections other than the drive system 108, by providing control signals to the sections.

The drive system 108 includes various apparatuses related to a driving system of the subject. For example, the drive system 108 includes a drive force generation apparatus for generating a drive force for an internal combustion engine, a driving motor, or the like, a drive force transmission mechanism for transmitting the drive force to wheels, a steering mechanism for adjusting a steering angle, a braking apparatus for generating a brake force, an ABS (Antilock Brake System), ESC (Electronic Stability Control), an electronic power steering apparatus, and the like.

The body system control section 109 generates and provides various control signals to the body system 110 to control the body system 110. Further, the body system control section 109 performs, as necessary, notification of a control state of the body system 110, for example, to the sections other than the body system 110, by providing control signals to the sections.

The body system 110 includes various body system apparatuses provided in the vehicle body. For example, the body system 110 includes a keyless entry system, a smart key system, a power window apparatus, a power sheet, a steering wheel, an air conditioner, various lamps (for example, headlamps, back lamps, brake lamps, blinkers, fog lamps, and the like), and the like.

The storage section 111 includes, for example, magnetic storage devices such as a ROM (Read Only Memory), a RAM (Random Access Memory), and an HDD (Hard Disc Drive), a semiconductor storage device, an optical storage device, a magneto-optical storage device, and the like. The storage section 111 stores various programs, data, and the like that are used by the sections of the vehicle control system 100. For example, the storage section 111 stores such map data as high-precision three-dimensional maps such as dynamic maps, global maps having lower precision than the high-precision maps but covering large areas, and local maps including information regarding the surroundings of the subject.

The self-driving control section 112 performs control related to self-driving such as autonomous travel or driving assistance. Specifically, for example, the self-driving control section 112 performs cooperative control intended to implement an ADAS (Advanced Driver Assistance System) function including avoidance of collision of the subject or relaxation of impact on the subject, follow-up driving based on an inter-vehicular distance, vehicle speed maintenance driving, warning for collision of the subject, warning for lane departure of the subject, or the like. Further, for example, the self-driving control section 112 performs cooperative control intended for self-driving corresponding to autonomous driving without depending on operation of the driver, and the like. The self-driving control section 112 includes a detection section 131, a self-position estimation section 132, a situation analysis section 133, a planning section 134, and an operation control section 135.

The detection section 131 detects various pieces of information required for controlling self-driving. The detection section 131 includes an exterior information detection section 141, an interior information detection section 142, and a vehicle state detection section 143.

The exterior information detection section 141 executes detection processing for information regarding the exterior of the subject on the basis of data or signals from the sections of the vehicle control system 100. For example, the exterior information detection section 141 executes detection processing, recognition processing, and tracking processing for objects around the subject, and detection processing for distances to the objects. The objects to be detected include, for example, vehicles, human beings, obstacles, structures, roads, traffic signals, traffic signs, road signs, and the like. Further, for example, the exterior information detection section 141 executes detection processing for surrounding environments of the subject. The surrounding environments to be detected include, for example, weather, temperature, humidity, brightness, the condition of a road surface, and the like. The exterior information detection section 141 provides data indicating the results of the detection processing to the self-position estimation section 132, a map analysis section 151, a traffic rule recognition section 152, and a situation recognition section 153 of the situation analysis section 133, an emergency avoidance section 171 of the operation control section 135, and the like.

The interior information detection section 142 executes detection processing for interior information on the basis of data or signals from the sections of the vehicle control system 100. For example, the interior information detection section 142 executes authentication processing and recognition processing for the driver, detection processing for the conditions of the driver, detection processing for passengers, detection processing for interior environments, and the like. The conditions of the driver to be detected include, for example, a physical condition, the degree of wakefulness, the degree of concentration, the degree of fatigue, the direction of line of sight, and the like. The interior environments to be detected include, for example, temperature, humidity, brightness, smell, and the like. The interior information detection section 142 provides data indicating the results of the detection processing to the situation recognition section 153 of the situation analysis section 133, the emergency avoidance section 171 of the operation control section 135, and the like.

The vehicle state detection section 143 executes detection processing for the state of the subject on the basis of data or signals from the sections of the vehicle control system 100. The state of the subject to be detected includes, for example, speed, acceleration, steering angle, the presence and content of abnormality, the state of driving operation, the position and inclination of a power seat, the state of a door lock, the states of other types of in-vehicle equipment, and the like. The vehicle state detection section 143 provides data indicating results for the detection processing to the situation recognition section 153 of the situation analysis section 133, the emergency avoidance section 171 of the operation control section 135, and the like.

The self-position estimation section 132 executes estimation processing for the position, posture, and the like of the subject on the basis of data or signals from the sections of the vehicle control system 100 such as the exterior information detection section 141 and the situation recognition section 153 of the situation analysis section 133. Further, the self-position estimation section 132 generates a local map used to estimate the self-position (hereinafter referred to as a map for self-position estimation), as necessary. The map for self-position estimation is, for example, a high-precision map using such a technique as SLAM (Simultaneous Localization and Mapping). The self-position estimation section 132 provides data indicating results for estimation processing to the map analysis section 151, the traffic rule recognition section 152, and the situation recognition section 153 of the situation analysis section 133 and the like. Further, the self-position estimation section 132 causes the storage section 111 to store the map for self-position estimation.

The situation analysis section 133 executes analysis processing for the subject and surrounding situation. The situation analysis section 133 includes the map analysis section 151, the traffic rule recognition section 152, the situation recognition section 153, and a situation prediction section 154.

The map analysis section 151 executes analysis processing for various maps stored in the storage section 111 while using, as necessary, data or signals from the sections of the vehicle control system 100 such as the self-position estimation section 132 and the exterior information detection section 141, thus constructing a map including information required for self-driving processing. The map analysis section 151 provides the constructed map to the traffic rule recognition section 152, the situation recognition section 153, and the situation prediction section 154 as well as a route planning section 161, an action planning section 162, and an operation planning section 163 of the planning section 134 and the like.

The traffic rule recognition section 152 executes recognition processing for traffic rules for the surroundings of the subject on the basis of data or signals from the sections of the vehicle control system 100 such as the self-position estimation section 132, the exterior information detection section 141, and the map analysis section 151. The recognition processing leads to recognition of, for example, the positions and states of traffic signals around the subject, the details of traffic regulations for the surroundings of the subject, lanes on which the subject can travel, and the like. The traffic rule recognition section 152 provides data indicating the results of the recognition processing to the situation prediction section 154 and the like.

The situation recognition section 153 executes recognition processing for the situation related to the subject, on the basis of data or signals from the sections of the vehicle control system 100 such as the self-position estimation section 132, the exterior information detection section 141, the interior information detection section 142, the vehicle state detection section 143, and the map analysis section 151. For example, the situation recognition section 153 executes recognition processing for the situation of the subject, the situation of surroundings of the subject, the situation of the driver of the subject, and the like. Further, the situation recognition section 153 generates, as necessary, a local map used to recognize the situation of the surroundings of the subject (hereinafter referred to as a map for situation recognition). The map for situation recognition is, for example, an occupancy grid map.

The situation of the subject to be recognized includes, for example, the position, posture, and motion of the subject (for example, speed, acceleration, moving direction, and the like), the presence and content of an abnormality, and the like. The situation of the surroundings of the subject to be recognized includes, for example, the types and positions of surrounding stationary bodies, the type, position, and motion of surrounding moving matter (for example, speed, acceleration, moving direction, and the like), the configuration of a surrounding road and the condition of the road surface, surrounding weather, temperature, humidity, and brightness, and the like. The conditions of the driver to be recognized include, for example, the physical condition, the degree of wakefulness, the degree of concentration, the degree of fatigue, the direction of line of sight, the driving operation, and the like.

The situation recognition section 153 provides the self-position estimation section 132, the situation prediction section 154, and the like with data indicating the results of the recognition processing (including the map for situation recognition, as necessary). Further, the situation recognition section 153 causes the map for situation recognition to be stored in the storage section 111.

The situation prediction section 154 executes prediction processing for the situation related to the subject, on the basis of data or signals from the sections of the vehicle control system 100 such as the map analysis section 151, the traffic rule recognition section 152, and the situation recognition section 153. For example, the situation prediction section 154 executes prediction processing for the situation of the subject, the situation of the surroundings of the subject, the situation of the driver, and the like.

The situation of the subject to be predicted includes, for example, the behavior of the subject, occurrence of an abnormality, a drivable distance, and the like. The situation of the surroundings of the subject to be predicted includes, for example, the behavior of moving matter around the subject, a change in the state of a traffic signal, a change in environment such as weather, and the like. The situation of the driver to be predicted includes, for example, the behavior and physical condition of the driver and the like.

The situation prediction section 154 provides data indicating results for the prediction processing to the route planning section 161, the action planning section 162, and the operation planning section 163 of the planning section 134 and the like along with data from the traffic rule recognition section 152 and the situation recognition section 153.

The route planning section 161 plans a route to a destination on the basis of data or signals from the sections of the vehicle control system 100 such as the map analysis section 151 and the situation prediction section 154. For example, the route planning section 161 sets a route from the current location to a specified destination on the basis of the global map. Further, for example, the route planning section 161 changes the route as appropriate on the basis of such situation as traffic jams, traffic accidents, traffic regulations, and construction works, the physical condition of the driver, and the like. The route planning section 161 provides data indicating the planned route to the action planning section 162 and the like.

On the basis of data or signals from the sections of the vehicle control system 100 such as the map analysis section 151 and the situation prediction section 154, the action planning section 162 plans the action of the subject such that the subject travels, within a planned period of time, safely through the route planned by the route planning section 161. For example, the action planning section 162 plans a start, a stop, a traveling direction (for example, moving forward, moving backward, a left turn, a right turn, a turnaround, and the like), a driving lane, a driving speed, passing, and the like. The action planning section 162 provides the operation planning section 163 and the like with data indicating the planned action of the subject.

The operation planning section 163 plans the operation of the subject to implement the action planned by the action planning section 162, on the basis of data or signals from the sections of the vehicle control system 100 such as the map analysis section 151 and the situation prediction section 154. For example, the operation planning section 163 plans acceleration, deceleration, a traveling trajectory, and the like. The operation planning section 163 provides data indicating the planned operation of the subject, to an acceleration and deceleration control section 172 and a direction control section 173 of the operation control section 135 and the like.

The operation control section 135 controls the operation of the subject. The operation control section 135 includes the emergency avoidance section 171, the acceleration and deceleration control section 172, and the direction control section 173.

The emergency avoidance section 171 executes detection processing for such emergencies as a collision, contact, entry into a danger zone, an abnormality in driver, an abnormality in vehicle, and the like, on the basis of results of detection by the exterior information detection section 141, the interior information detection section 142, and the vehicle state detection section 143. In a case of detecting a possible emergency, the emergency avoidance section 171 plans an operation of the subject such as a sudden stop or a hard turn which is performed to avoid the emergency. The emergency avoidance section 171 provides data indicating the planned operation of the subject, to the acceleration and deceleration control section 172, the direction control section 173, and the like.

The acceleration and deceleration control section 172 performs acceleration and deceleration control to implement the operation of the subject planned by the operation planning section 163 or the emergency avoidance section 171. For example, the acceleration and deceleration control section 172 calculates a control target value for a drive force generation apparatus or a braking apparatus for implementing the planned acceleration, deceleration, or sudden stop, and provides the drive system control section 107 with a control instruction indicative of the calculated control target value.

The direction control section 173 performs direction control for implementing the operation of the subject planned by the operation planning section 163 or the emergency avoidance section 171. For example, the direction control section 173 calculates a control target value for a steering mechanism for implementing the traveling trajectory or sudden stop planned by the operation planning section 163 or the emergency avoidance section 171, and provides the drive system control section 107 with a control instruction indicative of the calculated control target value.

In the vehicle control system 100 as described above, the interior information detection section 142 of the detection section 131 performs imaging of the vehicle interior and the like, and detects the boarding state of each passenger on the basis of an obtained image or the like. The interior information detection section 142 outputs a detection result to the situation analysis section 133. The situation analysis section 133 sets the moving body allowable acceleration on the basis of the detection result for the boarding state. Further, the situation analysis section 133 may select or switch a conversion table according to the situation of the subject and the situation of surroundings of the subject, and set the moving body allowable acceleration. The situation analysis section 133 outputs the set moving body allowable acceleration to the planning section 134. The planning section 134 sets, as the moving route for the moving body, a route involving acceleration equal to or lower than the moving body allowable acceleration or a route involving acceleration that is least different from the moving body allowable acceleration in a case where none of the routes involve acceleration equal to or lower than the moving body allowable acceleration. The operation control section 135 performs acceleration and deceleration control and direction control such that the moving body moves along the route set by the planning section 134. By performing acceleration and deceleration control and direction control according to the boarding state of each passenger as described above, the safety of the passengers can be improved.

The sequence of processing described herein can be executed by hardware, software, or a composite configuration of hardware and software. In a case where software-based processing is executed, a program in which a process sequence is recorded is installed in a memory in a computer integrated into dedicated hardware. Alternatively, the program may be executed by being installed in a general-purpose computer that can execute various types of processing.

For example, the program can be recorded in advance in a hard disk, an SSD (Solid State Drive), or an ROM (Read Only Memory) that is used as a recording medium. Alternatively, the program can be temporarily or permanently stored (recorded) in a removable recording medium such as a flexible disc, a CD-ROM (Compact Disc Read Only Memory), an MO (Magneto optical) disc, a DVD (Digital Versatile Disc), BD (Blu-Ray Disc (registered trademark), a magnetic disk, or a semiconductor memory card. Such a removable recording medium can be provided as what is generally called package software.

Further, other than being installed in the computer via the removable recording medium, the program may be transferred from a download site to the computer in a wireless or wired manner, via a network such as a LAN (Local Area Network) or the Internet. In the computer, the program thus transferred can be received and installed in a recording medium such as a built-in hard disk.

Note that the effects described herein are only illustrative and not restrictive and that additional effects not described herein may be produced. Further, the present technique should not be limited to the embodiments of the above-described technique, for interpretation. The embodiments of the present technique disclose the present technique in illustrative forms, and obviously, those skilled in the art may make modifications or replacements to the embodiments without departing from the scope of the present invention. In other words, claims should be taken into account for determination of the gist of the present technique.

Further, the information processing apparatus of the present technique can also take the following configurations.

(1) An information processing apparatus including:
an allowable acceleration setting section configured to set acceleration allowable for a moving body, on the basis of a boarding state of a passenger in the moving body.

(2) The information processing apparatus according to (1), in which the allowable acceleration setting section uses a posture of the passenger, as the boarding state of the passenger.

(3) The information processing apparatus according to (2), in which the allowable acceleration setting section uses, as the posture of the passenger, lateral spacing between feet of the passenger and an arrangement angle of the feet with respect to a moving direction of the moving body.

(4) The information processing apparatus according to (2) or (3), in which the allowable acceleration setting section uses a posture holding state of the passenger, as the posture of the passenger.

(5) The information processing apparatus according to any one of (1) to (4), in which the allowable acceleration setting section uses a position of the passenger in the moving body, as the boarding state of the passenger, to set the allowable acceleration.

(6) The information processing apparatus according to any one of (1) to (5), in which the allowable acceleration setting section sets the allowable acceleration on the basis of a temporal change in the boarding state of the passenger.

(7) The information processing apparatus according to any one of (1) to (6), in which the allowable acceleration setting section sets the allowable acceleration, by using a conversion table indicating a relation between the boarding state of the passenger and the allowable acceleration.

(8) The information processing apparatus according to (7), in which the allowable acceleration setting section uses, as the conversion table, a conversion table corresponding to a moving situation of the moving body.

(9) The information processing apparatus according to (8), in which the allowable acceleration setting section uses a conversion table corresponding to a moving route for the moving body.

(10) The information processing apparatus according to (8), in which the allowable acceleration setting section switches the conversion table according to a change in the moving situation of the moving body.

(11) The information processing apparatus according to any one of (1) to (10), in which the allowable acceleration setting section determines the allowable acceleration for each of the passengers in the moving body, performs integration on the allowable acceleration determined for the respective passengers, and sets acceleration allowable for the moving body.

(12) The information processing apparatus according to any one of (1) to (11), further including:

an imaging section configured to image the passenger in the moving body; and a boarding state detection section configured to detect the boarding state of the passenger on the basis of a captured image acquired by the imaging section.

Further, the movement control apparatus of the present technique can also take the following configurations.

(1) A movement control apparatus including:

an allowable acceleration setting section configured to set acceleration allowable for a moving body, on the basis of a boarding state of a passenger in the moving body; and a control section configured to control movement of the moving body in such a manner as to avoid exceeding the allowable acceleration set by the allowable acceleration setting section.

(2) The movement control apparatus according to (1), in which the control section includes a route planning section configured to set a moving route for the moving body, and the route planning section sets the moving route according to the allowable acceleration.

(3) The movement control apparatus according to (2), in which the route planning section uses, as a candidate route, a route involving acceleration not exceeding the allowable acceleration, and sets, as the moving route, a candidate route that involves lowest acceleration or acceleration that is least different from the allowable acceleration.

(4) The movement control apparatus according to (2) or (3), in which, in a case where no route involves acceleration equal to or lower than the allowable acceleration, the route planning section sets, as the moving route, a route involving lowest acceleration.

(5) The movement control apparatus according to any one of (1) to (4), further including:

an imaging section configured to image the passenger in the moving body; and a boarding state detection section configured to detect the boarding state of the passenger on the basis of a captured image acquired by the imaging section.

Further, the present technique may also be a program as described below.

(1) A program causing a computer to execute an acceleration control section of a moving body, the program causing the computer to execute:

a procedure for setting acceleration allowable for a moving body, on the basis of a boarding state of a passenger in the moving body.

(2) A program causing a computer to execute movement control of a moving body, the program causing the computer to execute:

a procedure for setting acceleration allowable for a moving body, on the basis of a boarding state of a passenger in the moving body; and a procedure for performing movement control of the moving body in such a manner as to avoid exceeding the allowable acceleration set.

REFERENCE SIGNS LIST

10: Information processing apparatus
15: Movement control apparatus
20: Imaging section
30: Boarding state detection section
40, 40-1, 40-2, 40-3, 40-4: Allowable acceleration setting section
41: Conversion table storage section
42: State information storage section
43: Conversion table correction section
44: Conversion table selection section
45: Individual allowable acceleration determination section
47: Individual allowable acceleration adjustment section
48: Individual allowable acceleration integration section
50: Control section
51: Acceleration determination section
52: Route planning section

The invention claimed is:

1. An information processing apparatus comprising:

an allowable acceleration setting section configured to set acceleration allowable for a moving body, on a basis of a boarding state of a passenger in the moving body, wherein the boarding state of the passenger includes a posture of the passenger, lateral spacing between feet of the passenger, and an arrangement angle of the feet with respect to a moving direction of the moving body; and a control section configured to control movement of the moving body in such a manner as to avoid exceeding the allowable acceleration set by the allowable acceleration setting section.

2. The information processing apparatus according to claim 1, wherein the allowable acceleration setting section uses a posture holding state of the passenger, as the posture of the passenger.

3. The information processing apparatus according to claim 1, wherein the allowable acceleration setting section uses a position of the passenger in the moving body, as the boarding state of the passenger, to set the allowable acceleration.

4. The information processing apparatus according to claim 1, wherein the allowable acceleration setting section sets the allowable acceleration on a basis of a temporal change in the boarding state of the passenger.

5. The information processing apparatus according to claim 1, wherein the allowable acceleration setting section sets the allowable acceleration, by using a conversion table indicating a relation between the boarding state of the passenger and the allowable acceleration.

6. The information processing apparatus according to claim 5, wherein the allowable acceleration setting section uses, as the conversion table, a conversion table corresponding to a moving situation of the moving body.

7. The information processing apparatus according to claim 6, wherein the allowable acceleration setting section uses a conversion table corresponding to a moving route for the moving body.

8. The information processing apparatus according to claim 6, wherein the allowable acceleration setting section switches the conversion table according to a change in the moving situation of the moving body.

9. The information processing apparatus according to claim 1, wherein the allowable acceleration setting section determines the allowable acceleration for each of the passengers in the moving body, performs integration on the allowable acceleration determined for the respective passengers, and sets acceleration allowable for the moving body.

10. The information processing apparatus according to claim 1, further comprising:

an imaging section configured to image the passenger in the moving body; and a boarding state detection section configured to detect the boarding state of the passenger on a basis of a captured image acquired by the imaging section.

11. An information processing method comprising:

setting, by an allowable acceleration setting section, acceleration allowable for a moving body, on a basis of a boarding state of a passenger in the moving body, wherein the boarding state of the passenger includes a posture of the passenger, lateral spacing between feet of the passenger, and an arrangement angle of the feet with respect to a moving direction of the moving body; and controlling, by a control section, movement of the moving body in such a manner as to avoid exceeding the allowable acceleration set by the allowable acceleration setting section.

12. A movement control apparatus comprising:

an allowable acceleration setting section configured to set acceleration allowable for a moving body, on a basis of a boarding state of a passenger in the moving body, wherein the boarding state of the passenger includes a posture of the passenger, lateral spacing between feet of the passenger, and an arrangement angle of the feet with respect to a moving direction of the moving body; and a control section configured to control movement of the moving body in such a manner as to avoid exceeding the allowable acceleration set by the allowable acceleration setting section.

13. The movement control apparatus according to claim 12, wherein the control section includes a route planning section configured to set a moving route for the moving body, and the route planning section sets the moving route according to the allowable acceleration.

14. The movement control apparatus according to claim 13, wherein the route planning section uses, as a candidate route, a route involving acceleration not exceeding the allowable acceleration, and sets, as the moving route, a candidate route that involves lowest acceleration or acceleration that is least different from the allowable acceleration.

15. The movement control apparatus according to claim 13, wherein, in a case where no route involves acceleration equal to or lower than the allowable acceleration, the route planning section sets, as the moving route, a route involving lowest acceleration.

16. The movement control apparatus according to claim 12, further comprising:

an imaging section configured to image the passenger in the moving body; and a boarding state detection section configured to detect the boarding state of the passenger on a basis of a captured image acquired by the imaging section.

17. A movement control method comprising:

setting, by an allowable acceleration setting section, acceleration allowable for a moving body, on a basis of a boarding state of a passenger in the moving body, wherein the boarding state of the passenger includes a posture of the passenger, lateral spacing between feet of the passenger, and an arrangement angle of the feet with respect to a moving direction of the moving body; and controlling, by a control section, movement of the moving body in such a manner as to avoid exceeding the allowable acceleration set by the allowable acceleration setting section.

\* \* \* \* \*